US012739061B2

(12) United States Patent
Zeng et al.

(10) Patent No.: US 12,739,061 B2
(45) Date of Patent: Sep. 15, 2026

(54) HYBRID AUTOMATIC REPEAT REQUEST ACKNOWLEDGEMENT (HARQ-ACK) CODEBOOK CONSTRUCTION METHOD AND TRANSMISSION METHOD, AND DEVICE

(71) Applicant: VIVO MOBILE COMMUNICATION CO., LTD., Dongguan (CN)

(72) Inventors: Chaojun Zeng, Dongguan (CN); Can Li, Dongguan (CN); Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 404 days.

(21) Appl. No.: 18/374,643

(22) Filed: Sep. 28, 2023

(65) Prior Publication Data

US 2024/0039660 A1 Feb. 1, 2024

Related U.S. Application Data

(63) Continuation of application No. PCT/CN2022/085033, filed on Apr. 2, 2022.

(30) Foreign Application Priority Data

Apr. 2, 2021 (CN) ......................... 202110362515.6

(51) Int. Cl.
*H04L 1/1812* (2023.01)
*H04W 72/1273* (2023.01)
*H04W 72/232* (2023.01)

(52) U.S. Cl.
CPC ....... *H04L 1/1812* (2013.01); *H04W 72/1273* (2013.01); *H04W 72/232* (2023.01)

(58) Field of Classification Search
CPC ... H04L 1/1812; H04L 1/1961; H04L 1/1854; H04L 1/1864; H04L 5/0055; H04W 72/232; H04W 72/1273; H04B 7/0456
See application file for complete search history.

(56) References Cited

U.S. PATENT DOCUMENTS

2022/0015091 A1* 1/2022 Li ......................... H04L 1/1854
2022/0271873 A1* 8/2022 Gao ...................... H04L 1/1854
(Continued)

FOREIGN PATENT DOCUMENTS

CN 111435881 A 7/2020
CN 111770572 A 10/2020
(Continued)

OTHER PUBLICATIONS

International Search Report issued in corresponding International Application No. PCT/CN2022/085033, mailed Jun. 28, 2022, 4 pages.

(Continued)

*Primary Examiner* — Rasheed Gidado
(74) *Attorney, Agent, or Firm* — IPX PLLC

(57) ABSTRACT

A Hybrid Automatic Repeat reQuest ACKnowledgement (HARQ-ACK) codebook construction method and transmission method, and a device, are provided. The HARQ-ACK codebook construction method includes: obtaining a time domain feedback record set, where each time domain feedback record in the time domain feedback record set includes a time domain resource assignment record and an equivalent feedback time offset corresponding to the time domain resource assignment record, and the equivalent feedback time offset is a feedback time offset value actually applied when a HARQ-ACK for the time domain resource assignment record corresponding to the equivalent feedback time offset is fed back in an uplink slot; dividing the time domain feedback record set into subsets based on equivalent feed- (Continued)

back time offset(s), where each equivalent feedback time offset corresponds to one subset; and constructing a HARQ-ACK codebook based on the subsets obtained through division, to perform feedback in the uplink slot.

20 Claims, 9 Drawing Sheets

(56) References Cited

U.S. PATENT DOCUMENTS

2022/0393837 A1* 12/2022 Yang .................... H04L 5/0055
2023/0291504 A1* 9/2023 Cheng .................. H04L 1/1896

FOREIGN PATENT DOCUMENTS

CN 111865506 A 10/2020
CN 112311512 A 2/2021
WO 2020144832 A1 7/2020

OTHER PUBLICATIONS

VIVO, "Remaining issues on mode 1 resource allocation mechanism", 3GPP TSG RAN WG1 #100bis R1-2001660, Apr. 2020, 19 pages.
First Office Action issued in related Chinese Application No. 202110362515.6, mailed Apr. 1, 2023, 4 pages.
Extended European Search Report issued in related European Application No. 22779172.0, mailed Aug. 6, 2024, 8 pages.
Huawei et al: "UCI enhancements for URLLC", 3GPP Draft; R1-1900044, Jan. 2019, 8 pages.
Ericsson: "PDSCH/PUSCH enhancements", 3GPP Draft; R1-2101310, Jan. 2021, 27 pages.

* cited by examiner

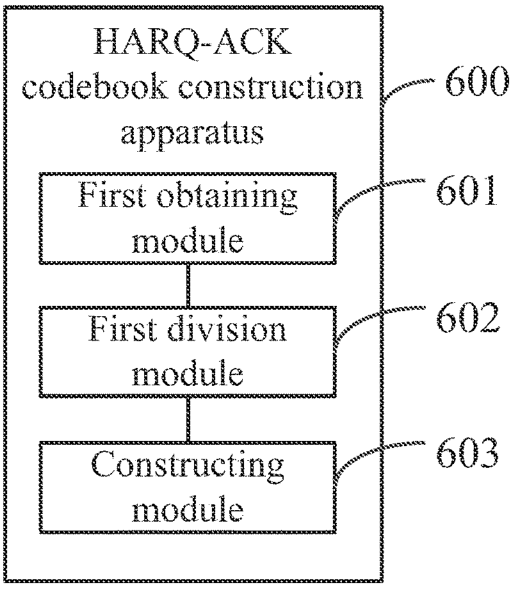
FIG. 6
A network side device receives and parses a HARQ-ACK codebook sent by a terminal
701
FIG. 7
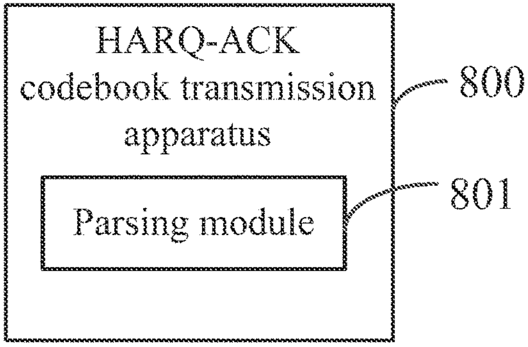
FIG. 8

HYBRID AUTOMATIC REPEAT REQUEST ACKNOWLEDGEMENT (HARQ-ACK) CODEBOOK CONSTRUCTION METHOD AND TRANSMISSION METHOD, AND DEVICE

CROSS-REFERENCE TO RELATED APPLICATIONS

This application is a continuation of International Application No. PCT/CN2022/085033, filed on Apr. 2, 2022, which claims priority to Chinese Patent Application No. 202110362515.6, filed Apr. 2, 2021. The entire contents of each of the above-identified applications are expressly incorporated herein by reference.

TECHNICAL FIELD

This application is directed to the field of communication technologies, and specifically relates to a Hybrid Automatic Repeat reQuest ACKnowledgement (HARQ-ACK) codebook construction method and transmission method, and a device.

BACKGROUND

For Multiple Physical Downlink Shared CHannel (Multi-PDSCH) scheduling, when a Hybrid Automatic Repeat reQuest ACKnowledgement (HARQ-ACK) semi-static codebook is configured for use, it needs to be ensured that a corresponding HARQ-ACK bit for each scheduled PDSCH is included in the codebook, and redundant bits are as few as possible. Currently, for multi-PDSCH scheduling, by extending the set of candidate downlink slots and determining the set of candidate transmission occasions respectively to construct the codebook, some redundant bits may be introduced into the constructed codebook, thereby resulting in relatively large overheads and a waste of resources.

SUMMARY

Embodiments of this application provide a Hybrid Automatic Repeat reQuest ACKnowledgement (HARQ-ACK) codebook construction method and transmission method, and a device, to resolve an existing problem that a redundancy bit is introduced when a terminal constructs a HARQ-ACK codebook, resulting in relatively large overheads.

According to a first aspect, a hybrid automatic repeat request acknowledgement HARQ-ACK codebook construction method is provided, including:

obtaining, by a terminal, a time domain feedback record set, where each time domain feedback record in the time domain feedback record set includes a time domain resource assignment record and an equivalent feedback time offset corresponding to the time domain resource assignment record, and the equivalent feedback time offset is a feedback time offset value actually applied when a HARQ-ACK for the time domain resource assignment record corresponding to the equivalent feedback time offset is fed back in an uplink slot;

dividing, by the terminal, the time domain feedback record set into a plurality of subsets based on equivalent feedback time offset(s), where each equivalent feedback time offset corresponds to one subset; and constructing, by the terminal, a HARQ-ACK codebook based on the plurality of subsets obtained through division, to perform feedback in the uplink slot.

According to a second aspect, a hybrid automatic repeat request acknowledgement HARQ-ACK codebook construction apparatus is provided, including:

an obtaining module, configured to obtain a time domain feedback record set, where each time domain feedback record in the time domain feedback record set includes a time domain resource assignment record and an equivalent feedback time offset corresponding to the time domain resource assignment record, and the equivalent feedback time offset is a feedback time offset value actually applied when a HARQ-ACK for the time domain resource assignment record corresponding to the equivalent feedback time offset is fed back in an uplink slot;

a division module, configured to divide the time domain feedback record set into a plurality of subsets based on equivalent feedback time offset(s), where each equivalent feedback time offset corresponds to one subset; and a constructing module, configured to construct a HARQ-ACK codebook based on the plurality of subsets obtained through division, to perform feedback in the uplink slot.

According to a third aspect, a HARQ-ACK codebook transmission method is provided, including:

receiving and parsing, by a network side device, a HARQ-ACK codebook sent by a terminal, where the HARQ-ACK codebook is constructed based on a plurality of subsets obtained through division obtained by obtaining a time domain feedback record set and dividing the time domain feedback record set into the plurality of subsets by the terminal.

According to a fourth aspect, a HARQ-ACK codebook transmission apparatus is provided, including:

a parsing module, configured to receive and parse a HARQ-ACK codebook sent by a terminal, where the HARQ-ACK codebook is constructed based on a plurality of subsets obtained through division obtained by obtaining a time domain feedback record set and dividing the time domain feedback record set into the plurality of subsets by the terminal.

According to a fifth aspect, a terminal is provided. The terminal includes a processor, a memory, and a program or an instruction that is stored in the memory and that can be run on the processor, where the program or the instruction is executed by the processor to implement the steps of the HARQ-ACK codebook construction method in the first aspect.

According to a sixth aspect, a terminal is provided, including a processor and a communication interface, where the processor is configured to:

obtain a time domain feedback record set, where each time domain feedback record in the time domain feedback record set includes a time domain resource assignment record and an equivalent feedback time offset corresponding to the time domain resource assignment record, and the equivalent feedback time offset is a feedback time offset value actually applied when a HARQ-ACK for the time domain resource assignment record corresponding to the equivalent feedback time offset is fed back in an uplink slot;

divide the time domain feedback record set into a plurality of subsets based on equivalent feedback time offset(s), where each equivalent feedback time offset corresponds to one subset; and construct a HARQ-ACK codebook based on the plurality of subsets obtained through division, to perform feedback in the uplink slot.

According to a seventh aspect, a network side device is provided, including a processor, a memory, and a program or an instruction that is stored in the memory and that can be run on the processor, where the program or the instruction is executed by the processor to implement the steps of the HARQ-ACK codebook transmission method in the third aspect.

According to an eighth aspect, a network side device is provided, including a processor and a communication interface, where the communication interface is configured to receive a HARQ-ACK codebook sent by a terminal, and the processor is configured to parse the HARQ-ACK codebook, where the HARQ-ACK codebook is constructed based on a plurality of subsets obtained through division obtained by obtaining a time domain feedback record set and dividing the time domain feedback record set into the plurality of subsets by the terminal.

According to a ninth aspect, a readable storage medium is provided, where the readable storage medium stores a program or an instruction, and the program or the instruction is executed by a processor to implement the steps of the HARQ-ACK codebook construction method in the first aspect, or the steps of the HARQ-ACK codebook transmission method in the third aspect.

According to a tenth aspect, a chip is provided, where the chip includes a processor and a communication interface, the communication interface is coupled to the processor, and the processor is configured to run a program or an instruction to implement the HARQ-ACK codebook construction method in the first aspect, or the steps of the HARQ-ACK codebook transmission method in the third aspect.

According to an eleventh aspect, a computer program/program product is provided, where the computer program/program product is stored in a storage medium, and the computer program/program product is executed by at least one processor to implement the steps of the HARQ-ACK codebook construction method in the first aspect, or the steps of the HARQ-ACK codebook transmission method in the third aspect.

According to a twelfth aspect, a communication device is provided, configured to perform the steps of the HARQ-ACK codebook construction method in the first aspect, or the steps of the HARQ-ACK codebook transmission method in the second aspect.

In the embodiments of this application, a terminal defines an equivalent feedback time offset based on a feedback time offset value actually applied when a HARQ-ACK for a time domain resource assignment record corresponding to the equivalent feedback time offset is fed back in an uplink slot. Therefore, a time domain feedback record set obtained by the terminal is a set of time domain feedback records that can be actually scheduled, and a HARQ-ACK codebook is constructed based on the set of time domain feedback records that can be actually scheduled. In this way, it can be ensured that only HARQ-ACK bit(s) corresponding to candidate transmission occasion(s) that can be actually scheduled exists in the constructed codebook, thereby avoiding any redundant HARQ-ACK bit in the codebook and effectively reducing overheads of the terminal.

BRIEF DESCRIPTION OF DRAWINGS

FIG. 6 is a structural diagram of a HARQ-ACK codebook construction apparatus according to an embodiment of this application;

FIG. 7 is a flowchart of a HARQ-ACK codebook transmission method according to an embodiment of this application;

FIG. 8 is a structural diagram of a HARQ-ACK codebook transmission apparatus according to an embodiment of this application;

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first," "second," and the like are intended to distinguish between similar objects but do not describe a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a New Radio (NR) system for example purposes, and NR terms are used in most of the following descriptions, but these technologies can also be applied to an application other than an NR system application, for example, a $6^{th}$ Generation (6G) communications system.

Figure 1:
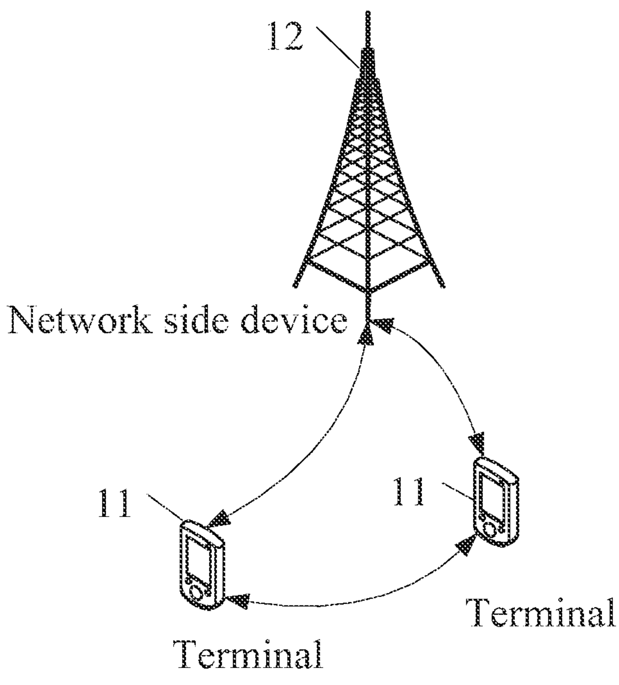
FIG. 1 is a block diagram of a wireless communication system to which the embodiments of this application can be applied.

FIG. 1 is a block diagram of a wireless communication system to which embodiments of this application can be applied. The wireless communications system includes a terminal 11 and a network side device 12. The terminal 11 may also be referred to as a terminal device or User Equipment (UE). The terminal 11 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device, Vehicle User Equipment (VUE), or Pedestrian User Equipment (PUE). The wearable device includes a smart watch, a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a Wireless Local Area Network (WLAN) access point, a Wireless Fidelity (Wi-Fi) node, a Transmitting Receiving Point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

To better understand the technical solutions provided in the embodiments of this application, the following describes the technical scenes and related technical concepts in the embodiments of this application.

When a terminal constructs a HARQ-ACK, for an active BandWidth Part (BWP) of a configuration carrier, the terminal first determines a candidate downlink slot, then determines a candidate transmission occasion set corresponding to each candidate downlink slot, and sets or reserves a corresponding HARQ-ACK bit in a codebook for each candidate transmission occasion of each candidate downlink slot. When a downlink slot set is extended and a candidate transmission occasion set is determined separately for Multiple Physical Downlink Shared CHannel (Multi-PDSCH) scheduling, some redundant bits may be introduced into a finally constructed codebook, and these redundant bits do not correspond to actual scheduling, thereby resulting in relatively large overheads of the terminal and a waste.

It should be noted that an example form of a feedback time offset is K1, which is used to indicate an offset of a time domain location of a HARQ-ACK feedback relative to a time domain location of PDSCH transmission. A unit of the offset is a time unit, which may be a slot or sub-slot. A feedback time offset mentioned below may be described by using K1 as an example, but other representation forms of the feedback time offset are not limited.

Figure 2:
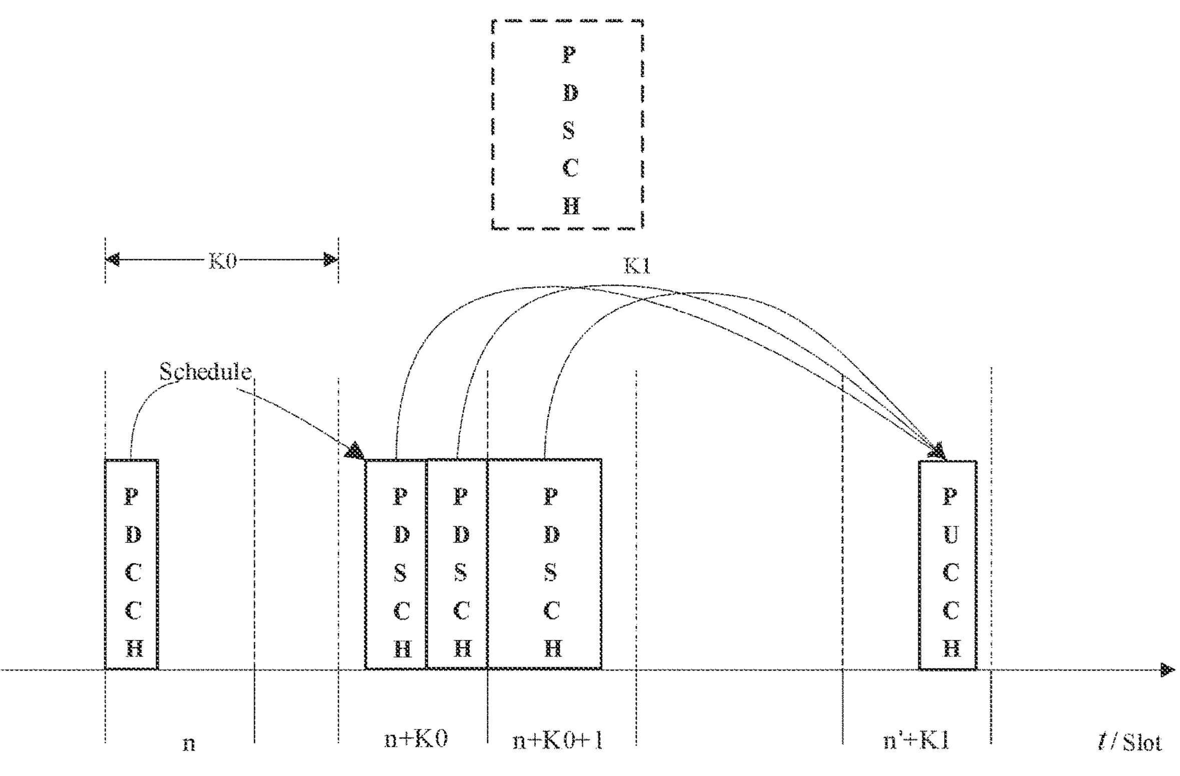
FIG. 2 is a schematic diagram in which a HARQ-ACK is fed back on a single PUCCH for multi-PDSCH scheduling according to an embodiment of this application.

As shown in FIG. 2, it is assumed that only a single serving cell is configured for the terminal, a K1 set configured by a higher layer includes only a single K1 value, and a Time Domain Resource Assignment Table (TDRA Table) includes only two rows, where one row corresponds to a single Start and Length Indicator Value (SLIV) and a symbol index range occupied by the SLIV may be (0-13), and the other row corresponds to three SLIVs and symbol index ranges respectively corresponding to the three SLIVs are: (2-7), (8-13), and (0-10) and span two downlink slots. Only the single K1 is indicated in scheduling Downlink Control Information (DCI), and is employed an entire indicated row in the scheduling DCI. Each PDSCH corresponding to the entire row feeds back a corresponding HARQ-ACK on a same Physical Uplink Control CHannel (PUCCH). A time domain location of the PUCCH is determined based on a slot in which an end moment of a last PDSCH corresponding to the entire row is located and the indicated K1. When a candidate downlink slot set is extended for multi-PDSCH scheduling, the terminal generally assumes that a PDSCH set scheduled by a single piece of DCI spans a maximum of N uplink slots (N is determined based on the TDRA Table, for example, N is a maximum value of a quantity of uplink slots spanned by each row). In this case, each K1 value in the K1 set is extended to {K1+(N−1), . . . , K1+1, K1}, and a union set of an extension set corresponding to each K1 value is taken as an extended K1 set. A Candidate DownLink slot (Candidate DL slot) set is determined to be extended based on a feedback slot and the extended K1 set. In FIG. 2, based on the foregoing method, it may be learned that the extended K1 set includes two values: K1 and K1+1, and then candidate transmission occasions sets are separately determined for candidate downlink slots corresponding to K1 and K1+1.

When determining a candidate transmission occasion set corresponding to a single K1 value, the terminal generally takes each SLIV of each row in the TDRA table to form an SLIV set, and divides the SLIV set into one or more SLIV subsets based on an overlapping grouping method in an existing protocol (for example, deleting an SLIV that conflicts with a semi-static UpLink (UL) symbol), where each SLIV subset corresponds to one candidate transmission occasion. Because there is time domain overlapping between SLIVs in a single SLIV subset and scheduling cannot be performed at the same time, only a single SLIV in the single SLIV subset is necessarily scheduled at most. In FIG. 2, based on the foregoing method, the SLIV set formed by each SLIV of each row in the TDRA table is {(2-7), (8-13), (0-10), and (0-13)}, and may be divided into two SLIV subsets {(2-7), (0-10), (0-13)}, and {(8-13)}. Assuming that in a configuration based on a Time Division Duplex Pattern (TDD Pattern), there is no SLIV that conflicts with the semi-static UL symbol, the foregoing two SLIV subsets obtained through division are applicable to both K1 and K1+1.

Based on the foregoing method, in a constructed semi-static codebook in FIG. 2, there are HARQ-ACK bits corresponding to four candidate transmission occasions in {(SLIV subset 1, K1+1), (SLIV subset 2, K1+1), (SLIV subset 1, K1), and (SLIV subset 2, K1)}. Assuming that each candidate transmission occasion corresponds to one bit, the semi-static codebook includes four bits. Actually, because at most three PDSCHs need to feed back a HARQ-ACK in this semi-static codebook, there are three corresponding candidate transmission occasions at most. Correspondingly, in the foregoing determined candidate transmission occasion set, a candidate transmission occasion corresponding to (SLIV subset 2, K1) cannot be actually scheduled. Therefore, the corresponding HARQ-ACK bit is not used, thereby resulting in unnecessary feedback overheads of the terminal. However, when the terminal is configured with a larger K1 set and a more complex TDRA table, there are more unnecessary feedback overheads.

The embodiments of this application provide a HARQ-ACK codebook construction method, to avoid unnecessary feedback overheads of the terminal.

With reference to the accompanying drawings, the following describes in detail the HARQ-ACK codebook construction method provided in the embodiments of this application by using some embodiments and application scenes thereof.

Figure 3:
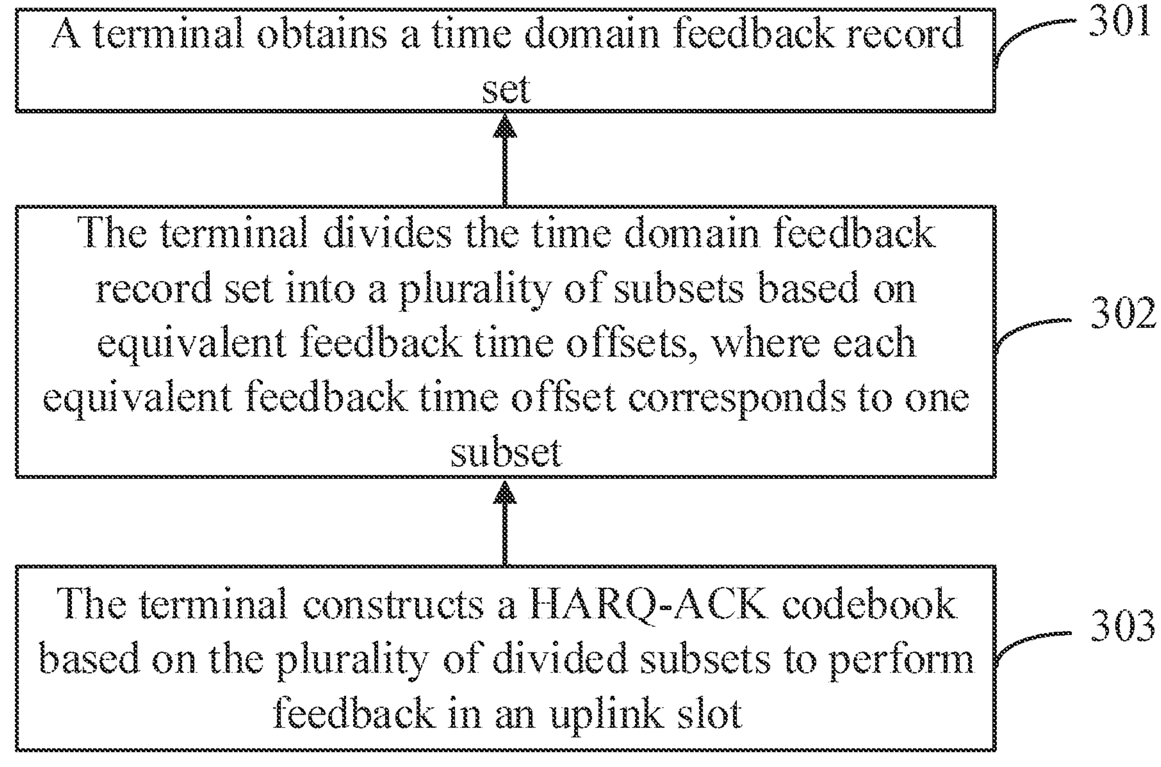
FIG. 3 is a flowchart of a HARQ-ACK codebook construction method according to an embodiment of this application.

Referring to FIG. 3, FIG. 3 is a flowchart of a HARQ-ACK codebook construction method according to an embodiment of this application. As shown in FIG. 3, the method includes the following steps:

Step 301: A terminal obtains a time domain feedback record set.

Each time domain feedback record in the time domain feedback record set includes a time domain resource assignment record and an equivalent feedback time offset corresponding to the time domain resource assignment record, and the equivalent feedback time offset is a feedback time offset value actually applied when a HARQ-ACK for the time domain resource assignment record corresponding to the equivalent feedback time offset is fed back in an uplink slot.

It should be noted that, in a typical representation form, the time domain resource assignment record may be an SLIV. To better understand the technical solutions in the embodiments of this application, an example in which the time domain resource assignment record is an SLIV is used for illustration in the following embodiments. Certainly, the time domain resource assignment record may be in another form, and no further example is provided in this application.

In this embodiment of this application, a time domain feedback record includes a time domain resource assignment record and an equivalent feedback time offset corresponding to the time domain resource assignment record. For example, a representation form of the time domain feedback record is an (SLIV, equivalent K 1) record. For a specified (SLIV, equivalent K 1) record, an SLIV corresponds to a specified SLIV in an indicated row in a time domain resource assignment table, and the equivalent K1 is a K1 value actually applied when a HARQ-ACK corresponding to the SLIV is fed back in an uplink slot or sub-slot, where the uplink slot or sub-slot is an uplink slot or sub-slot in which transmission of a HARQ-ACK codebook is located.

In some implementations, in a case that all PDSCHs scheduled by a single piece of DCI feeds back a HARQ-ACK on a same PUCCH, the terminal may collect time domain feedback records corresponding to all initial candidate transmission occasions that are possibly scheduled, to obtain the time domain feedback record set.

In some implementations, step 301 may include:

collecting, by the terminal, time domain feedback records corresponding to all initial candidate transmission occasions that are possibly scheduled, to obtain the time domain feedback record set.

It can be understood that, when a candidate transmission occasion is determined, the candidate transmission occasion is determined based on a single SLIV in a specified row in the time domain resource assignment table, and the entire row corresponds to a single candidate transmission occasion in this case; or the candidate transmission occasion is determined based on each SLIV in a specified row in the time domain resource assignment table, and each SLIV in this row is in a one-to-one correspondence with a single candidate transmission occasion in this case. In this embodiment of this application, the terminal may collect the time domain feedback records corresponding to all the initial candidate transmission occasions that are possibly scheduled, and take a union set of the collected time domain feedback records, to obtain the time domain feedback record set.

In some implementations, the collecting, by the terminal, time domain feedback records corresponding to all initial candidate transmission occasions that are possibly scheduled includes:

traversing, by the terminal, all feedback time offsets in a feedback time offset set, traversing all rows or all schedulable rows in a time domain resource assignment table, and traversing all time domain resource assignment records in any row or any schedulable row in the time domain resource assignment table, to obtain the time domain feedback records corresponding to all the initial candidate transmission occasions.

It should be noted that the feedback time offset set may be a feedback time offset set configured by a higher layer, for example, a K1 set configured by higher layer signaling.

In some implementations, the terminal may select a single feedback time offset in the feedback time offset set, traverse all rows in the time domain resource assignment table, and determine a time domain feedback record (SLIV, equivalent K1) corresponding to each row. For example, it is assumed that the K1 set includes M K1, and the time domain resource assignment table includes N rows. Based on the foregoing manner, M×N times of traversal need to be performed, and one or more time domain feedback records can be obtained through one time of traversal, to obtain the time domain feedback record set.

In this embodiment of the present disclosure, the traversing, by the terminal, all feedback time offsets in a feedback time offset set, traversing all rows or all schedulable rows in a time domain resource assignment table, and traversing all time domain resource assignment records in any row or any schedulable row in the time domain resource assignment table, to obtain the time domain feedback records corresponding to all the initial candidate transmission occasions includes:

for a target feedback time offset and a first target row, assuming, by the terminal, that HARQ-ACK information corresponding to one piece of downlink control information (DCI) is fed back in the HARQ-ACK codebook based on the target feedback time offset and one or more PDSCHs scheduled by the first target row, and traversing all time domain resource assignment records of the first target row, to determine one or more time domain feedback records corresponding to the pair of the target feedback time offset and the first target row; and taking, by the terminal, a union set of the obtained time domain feedback records, to obtain the time domain feedback record set corresponding to all the initial candidate transmission occasions, where the target feedback time offset is any feedback time offset obtained by traversing the feedback time offset set, the first target row is any row or any schedulable row obtained by traversing the time domain resource assignment table based on the target feedback time offset, and one PDSCH in the one or more scheduled PDSCHs corresponds to one initial candidate transmission occasion and one time domain feedback record.

It should be noted that, for the time domain resource assignment table, it is assumed that each row includes one or more SLIVs. Based on these SLIVs and common or independent K0 configurations, one or more corresponding continuous or discontinuous PDSCH sequences may be determined as a PDSCH set. The terminal may take any feedback time offset (that is, the target feedback time offset) in the feedback time offset set configured by the higher layer, and any row or any schedulable row (that is, the first target row) in the time domain resource assignment table. It is assumed that same downlink scheduling DCI indicates that the first target row is used to determine time domain resource assignment of a scheduled PDSCH set, that is, each SLIV is in a one-to-one correspondence with a single PDSCH, and indicates to employ the target feedback time offset, so as to determine to feed back a corresponding HARQ-ACK in a transmission uplink slot or sub-slot feedback in a constructed half-static codebook. The terminal traverses all SLIVs in the first target row, to determine the target feedback time offset and a time domain feedback record (SLIV, equivalent K1) corresponding to one or more initial candidate transmission occasions corresponding to the first target row.

Based on the foregoing manner, the terminal can also traverse K1 in the K1 set, traverse all rows or all schedulable rows in the time domain resource assignment table, and traverse all time domain resource assignment records corresponding to any row or any schedulable row in the time domain resource assignment table. Based on traversal of the three dimensions, the time domain feedback records corresponding to all the initial candidate transmission occasions are obtained, and the union set of the obtained time domain feedback records is taken, to obtain the time domain feedback record set corresponding to all the initial candidate transmission occasions.

It should be noted that, for a specified time domain feedback (SLIV, equivalent K1) record obtained based on traversal of target K1 and the first target row, the SLIV corresponds to a specified SLIV in the first target row in the time domain resource assignment table, and the equivalent K1 is a K1 value actually applied when a HARQ-ACK corresponding to the SLIV is fed back in an uplink slot or sub-slot n, which may be understood as a time domain offset between a first time unit in which an end moment of a PDSCH corresponding to the SLIV is located and the uplink slot or sub-slot n. The first time unit herein may be a slot or sub-slot, and may be an uplink slot or sub-slot. Herein, the uplink slot or sub-slot n is an uplink slot or sub-slot in which transmission of the constructed HARQ-ACK codebook is located. When DCI is used for scheduling by indicating the first target row and the target K 1, the SLIV may be used to determine, based on a symbol range corresponding to the SLIV and a location of the SLIV in a corresponding row, a time domain location of the SLIV or a slot or sub-slot in which the SLIV is located.

In this embodiment of the present disclosure, the equivalent feedback time offset is determined based on the target feedback time offset and a target time domain offset, and the target time domain offset is a time domain offset between a slot or sub-slot in which an end moment of a time domain resource assignment record corresponding to the equivalent feedback time offset is located and a slot or sub-slot in which an end moment of a last time domain resource assignment record in the first target row is located.

For example, when DCI is used for scheduling by indicating the first target row and target K1, for equivalent K1 of the target K1, assuming that an uplink slot or sub-slot in which an end moment of an SLIV corresponding to the equivalent K1 is located is m1, and an uplink slot or sub-slot in which an end moment of a last SLIV in the first target row is m2, a time domain offset is m2−m1, and the equivalent K1 is also determined by using the target K1 and the time domain offset, for example, the equivalent K1=target K1+(m2−m1).

In some implementations, in a case that the terminal has determined a feedback time offset, for example, for the target feedback time offset, whether a row in the time domain resource assignment table is a schedulable row is determined in the following manner:

in a case that the uplink slot in which transmission of the HARQ-ACK codebook is located is determined, assuming, by the terminal, that a second target row employs the determined feedback time offset, and if a PDSCH corresponding to each time domain resource assignment record configured in the second target row does not conflict with any semi-static uplink symbol, determining the second target row as a schedulable row, where the second target row is any row in the time domain resource assignment table.

For example, the terminal may take any feedback time offset in the feedback time offset set, and the feedback time offset is a feedback time offset that has been determined by the terminal. When the uplink slot n in which transmission of the HARQ-ACK codebook is located is determined, and it is assumed that the determined feedback time offset is employed for any row (that is, the second target row) in the time domain resource assignment table, if a PDSCH corresponding to each time domain resource assignment record configured in the row (that is, the second target row) does not conflict with any semi-static uplink symbol, it is determined that the row (that is, the second target row) is a schedulable row. It should be noted that the second target row and the first target row are not specific rows, and both represent any row in the time domain resource assignment table. Therefore, the second target row and the first target row may be a same row in the time domain resource assignment table in some scenes.

Further, the traversing, by the terminal, all schedulable rows in a time domain resource assignment table includes:

determining, by the terminal based on a determined feedback time offset in the feedback time offset set, each row in the time domain resource assignment table is a schedulable row; and deleting, by the terminal, a row that is in the time domain resource assignment table and is not a schedulable row, and traversing the determined schedulable row.

It can be understood that, based on the foregoing manner, when determining the feedback time offset, the terminal determines whether each row in the time domain resource assignment table is a schedulable row, and for the schedulable row, determines a time domain feedback record corresponding to the schedulable row. When determining that a specific row in the time domain resource assignment table is not a schedulable row, the terminal deletes the row that is not a schedulable row, so that the terminal determines, only for each row in all schedulable rows in the time domain resource assignment table, a time domain feedback record corresponding to the row.

In this embodiment of this application, the terminal can further traverse all rows in the time domain resource assignment table. In some implementations, the traversing, by the terminal, all rows in a time domain resource assignment table includes:

traversing, by the terminal, all rows in the time domain resource assignment table based on a determined feedback time offset in the feedback time offset set.

In some implementations, based on the determined feedback time offset in the feedback time offset set, the terminal directly traverses all rows in the time domain resource assignment table and determines a time domain feedback record corresponding to the row, regardless of whether each row is a schedulable row. It should be noted that the terminal may take any feedback time offset in the feedback time offset set, and the feedback time offset is a feedback time offset that has been determined by the terminal.

For example, for the example in FIG. 2, the K1 set includes two values K1 and K1+1, and the time domain resource assignment table includes a first row and a second row. Assuming that there is no conflict with a semi-static uplink symbol, that is, each row is a schedulable row, the traversal process of the terminal in the example in FIG. 2 may be represented as follows:

The first row ((0-13), corresponding to a single SLIV) in the time domain resource assignment table and K1 are taken, and a time domain feedback record corresponding to a corresponding initial candidate transmission occasion is ((0-13), K1); and

- the second row ((2-7), (8-13), and (0-10), corresponding to three SLIVs) in the time domain resource assignment table and K1 are taken, and time domain feedback records corresponding to corresponding initial candidate transmission occasions are successively ((2-7), K1+1), ((8-13), K1+1), and ((0-10), K1).

It should be noted that, for (2-7) or (8-13), when K1 is indicated in the DCI, because an end location of the two time domain resource assignment records is in one slot ahead of an employed start reference point of K1, equivalent K1 thereof is K1+1. In this way, for the example in FIG. 2, the time domain feedback record set obtained by the terminal includes: ((0-13), K1), ((2-7), K1+1), ((8-13), K1+1), ((0-10), K1).

Step 302: The terminal divides the time domain feedback record set into a plurality of subsets based on equivalent feedback time offset(s), where each equivalent feedback time offset corresponds to one subset.

In this embodiment of this application, after the terminal obtains the time domain feedback record set, the time domain feedback record set includes at least one time domain feedback record, and each time domain feedback record includes a time domain resource assignment record and an equivalent feedback time offset corresponding to the time domain resource assignment record. In this case, the terminal may divide the time domain feedback record set into a plurality of subsets based on equivalent feedback time offset(s). For example, time domain feedback records corresponding to a same equivalent feedback time offset may be divided into one subset, so that each equivalent feedback time offset corresponds to one subset, and a quantity of subsets is the same as a quantity of equivalent feedback time offsets.

In some implementations, step 302 may include any one of the following:

- determining, by the terminal, an equivalent feedback time offset set, and traversing, based on a target equivalent feedback time offset, a time domain feedback record that is in the time domain feedback record set and that matches the target equivalent feedback time offset, to divide the time domain feedback record set into subsets, where the target equivalent feedback time offset is any equivalent feedback time offset in the equivalent feedback time offset set; and
- traversing, by the terminal, the time domain feedback record set, and in a case that there is a target subset corresponding to an equivalent feedback time offset corresponding to a target time domain feedback record in the time domain feedback record set, classifying the target time domain feedback record into the target subset, and in a case that there is no target subset corresponding to the equivalent feedback time offset corresponding to the target time domain feedback record, establishing a target subset corresponding to the target time domain feedback record, and classifying the target time domain feedback record into the target subset.

In some implementations, after obtaining the time domain feedback record set, the terminal may obtain an equivalent feedback time offset corresponding to each time domain feedback record, to obtain the equivalent feedback time offset set; or may determine the equivalent feedback time offset set based on an extended feedback time offset set, that is, the equivalent feedback time offset set is equivalent to the extended feedback time offset set. Further, the terminal traverses all time domain feedback records in the time domain feedback record set based on each equivalent feedback time offset in the equivalent feedback time offset set, to divide the time domain feedback record set into a plurality of subsets based on equivalent feedback time offset(s).

The terminal may traverse the time domain feedback record set based on each equivalent feedback time offset in the equivalent feedback time offset set through parallel traversal. For example, the equivalent feedback time offset set includes a first equivalent feedback time offset and a second equivalent feedback time offset. The time domain feedback record set may be traversed based on the first equivalent feedback time offset, to obtain a subset including a time domain feedback record that matches the first equivalent feedback time offset; and at the same time or before this, the time domain feedback record set is traversed based on the second equivalent feedback time offset, to obtain a subset including a time domain feedback record that matches the second equivalent feedback time offset. A sequence relationship between the traversal of the first equivalent feedback time offset and the traversal of the second equivalent feedback time offset is not limited and assumed.

In some implementations, the terminal may perform serial traversal. For example, the equivalent feedback time offset set includes a first equivalent feedback time offset and a second equivalent feedback time offset. After first traversing the time domain feedback record set based on the first equivalent feedback time offset and obtaining a subset including a time domain feedback record that matches the first equivalent feedback time offset, the terminal deletes, from the time domain feedback record set, all time domain feedback records that match the first equivalent feedback time offset, to obtain an updated time domain feedback record set. Further, the terminal traverses the updated time domain feedback record set based on the second equivalent feedback time offset, to obtain a subset including a time domain feedback record that matches the second equivalent feedback time offset. In this way, after a traversal process of a last equivalent feedback time offset is completed, the time domain feedback record set is a null set.

It should be noted that the time domain feedback record that is in the time domain feedback record set and that matches the target equivalent feedback time offset may mean that an equivalent feedback time offset corresponding to the time domain feedback record is the same as or equal to the target equivalent feedback time offset.

In some implementations, the terminal may directly traverse the time domain feedback record set. In a process of traversing the time domain feedback record set, for a specified time domain feedback record (that is, the target time domain feedback record), it is determined whether there is a target subset corresponding to an equivalent feedback time offset corresponding to the time domain feedback record. If yes, the time domain feedback record (that is, the target time domain feedback record) is classified into the target subset. If there is no target subset corresponding to the equivalent feedback time offset corresponding to the time domain feedback record, a corresponding target subset is established for the equivalent feedback time offset corresponding to the time domain feedback record, and the time domain feedback record is classified into the established target subset.

For example, for the example in FIG. 2, the time domain feedback record set obtained by the terminal includes ((0-13), K1), ((2-7), K1+1), ((8-13), K1+1), ((0-10), K1). Further, if the terminal performs subset division based on equivalent K1, time domain feedback record subsets ((0-13), K1), ((0-10), K1) corresponding to K1 and time domain feedback record subsets ((2-7), K1+1), ((8-13), K1+1) corresponding to K1+1 are obtained.

Step 303: The terminal constructs a HARQ-ACK codebook based on the plurality of subsets obtained through division, to perform feedback in the uplink slot.

In this embodiment of this application, after the terminal divides the time domain feedback record set into the plurality of subsets based on the equivalent feedback time offset, a set including the equivalent feedback time offset may be used as a feedback time offset set (for example, K1 set) for constructing a semi-static codebook, and a time domain resource assignment record (for example, SLIV) corresponding to each time domain feedback record in a subset corresponding to a specified equivalent feedback time offset may be used as each row in an equivalent time domain resource assignment table employed for the equivalent feedback time offset (for example, an operation that is the same as or similar to that each row may correspond to only a TDRA table of a single time domain resource assignment record may be performed), where each time domain feedback record in the subset or each row in the equivalent time domain resource assignment table correspond to a single time domain resource assignment record. In this way, the HARQ-ACK codebook may be constructed based on a predefined operation procedure (for example, a pseudo code procedure of constructing a semi-static codebook specified in an existing protocol).

In the technical solution provided in this embodiment of this application, a terminal defines an equivalent feedback time offset based on a feedback time offset value actually applied when a HARQ-ACK corresponding to a time domain resource assignment record is fed back in an uplink slot. Therefore, a time domain feedback record set obtained by the terminal is a time domain feedback record set that can be actually scheduled, and a HARQ-ACK codebook is constructed based on the time domain feedback record set that can be actually scheduled. In this way, it can be ensured that only a HARQ-ACK bit corresponding to a candidate transmission occasion that can be actually scheduled exists in the constructed codebook, thereby avoiding a redundant HARQ-ACK bit in the codebook and effectively reducing overheads of the terminal.

In some implementations, the constructing, by the terminal, a HARQ-ACK codebook based on the plurality of subsets obtained through division includes:

determining, by the terminal, a candidate transmission occasion set corresponding to a target serving cell based on the plurality of subsets obtained through division; and reserving and setting, by the terminal, a HARQ-ACK bit for each candidate transmission occasion in the candidate transmission occasion set, to obtain the HARQ-ACK codebook.

In this embodiment of this application, after dividing the time domain feedback record set into the plurality of subsets based on the equivalent feedback time offset, the terminal determines the candidate transmission occasion set corresponding to the target serving cell based on the plurality of subsets obtained through division. The target serving cell may be a serving cell currently accessed by the terminal, or any serving cell configured for the terminal. The terminal may traverse all equivalent feedback time offsets, and arrange one or more candidate transmission occasions corresponding to each equivalent feedback time offset in a preset order, to obtain the candidate transmission occasion set corresponding to the target serving cell. Further, the terminal reserves a HARQ-ACK bit for each candidate transmission occasion in the candidate transmission occasion set, and sets a value of the HARQ-ACK bits to obtain the HARQ-ACK codebook. In some implementations, the terminal cascades HARQ-ACK bit sequences corresponding to HARQ-ACK codebooks corresponding to one or more serving cells in a preset order, to obtain a concatenated HARQ-ACK bit sequence as a to-be-transmitted HARQ-ACK codebook. The preset order herein may be an ascending order or a descending order of indexes of the serving cells, or another preset or configured order.

In some implementations, the determining, by the terminal based on the plurality of subsets, a candidate transmission occasion set corresponding to a target serving cell includes:

traversing, by the terminal, all equivalent feedback time offsets, and dividing a subset corresponding to each equivalent feedback time offset into one or more time domain resource assignment record subsets based on time domain overlapping, where each time domain resource assignment record subset corresponds to one candidate transmission occasion; and arranging a candidate transmission occasion corresponding to each equivalent feedback time offset in a preset order, to obtain the candidate transmission occasion set corresponding to the target serving cell.

In this embodiment of this application, after dividing the time domain feedback record set into the plurality of subsets based on the equivalent feedback time offset, the terminal traverses all equivalent feedback time offsets. For a specified equivalent feedback time offset, a time domain feedback record subset corresponding to the equivalent feedback time offset is divided into a plurality of time domain resource assignment record subsets based on time domain overlapping, where each time domain resource assignment record subset corresponds to one candidate transmission occasion. In this way, one or more corresponding candidate transmission occasions are obtained for each equivalent feedback time offset, and the terminal cascades the one or more candidate transmission occasions corresponding to each obtained equivalent feedback time offset in a head-to-tail manner in a preset order, to obtain the candidate transmission occasion set corresponding to the target serving cell.

The preset order may be a descending order or an ascending order. For example, when the terminal determines the candidate transmission occasion set, each equivalent feedback time offset may be arranged in a descending order or an ascending order, and then one or more candidate transmission occasions corresponding to each equivalent feedback time offset are concatenated in a head-to-tail manner in an order of the equivalent feedback time offsets. For example, if the equivalent feedback time offset set includes a first equivalent feedback time offset and a second equivalent feedback time offset, one or more candidate transmission occasions corresponding to the first equivalent feedback time offset may be cascaded as a whole after one or more candidate transmission occasions corresponding to the second equivalent feedback time offset.

When a single equivalent feedback time offset corresponds to a plurality of candidate transmission occasions, the plurality of candidate transmission occasions may be arranged in a predefined order. For example, a time domain resource assignment record with an earliest ending symbol in a time domain resource assignment record subset corresponding to a candidate transmission occasion may be determined based on an operation output order, and the ending symbol of the time domain resource assignment record is used as an ending symbol corresponding to the candidate transmission occasion. Based on this manner, an ending symbol of each candidate transmission occasion in the plurality of candidate transmission occasions corresponding to the equivalent feedback time offset can be determined, and the plurality of candidate transmission occasions corresponding to the equivalent feedback time offset are arranged in an order of an ending symbol of each candidate transmission occasion.

For example, for the example in FIG. 2, the time domain feedback record set obtained by the terminal includes ((0-13), K1), ((2-7), K1+1), ((8-13), K1+1), ((0-10), K1). Further, the terminal performs subset division based on equivalent K1, to obtain time domain feedback record subsets ((0-13), K1), ((0-10), K1) corresponding to K1 and time domain feedback record subsets ((2-7), K1+1), ((8-13), K1+1) corresponding to K1+1. Assuming that each time domain resource assignment record does not overlap or conflict with a semi-static uplink symbol, a candidate transmission occasion list corresponding to K1 is ({(0-10), (0-13)}, K1), and a candidate transmission occasion list corresponding to K1+1 is ({(2-7)}, K1+1), ({8-13)}, K1+1), where {(0-10), (0-13)} is a time domain resource assignment record subset corresponding to K1, and {(2-7)} and {(8-13)} are a time domain resource assignment record subset 1 and a time domain resource assignment record subset 2 corresponding to K+1.

Further, if the equivalent K1 is arranged in a descending order, because K1+1 is greater than K1, the candidate transmission occasion set corresponding to the target serving cell is: ({(2-7)}, K1+1), ({(8-13)}, K1+1), ({(0-10), (0-13)}, K1).

In this embodiment of this application, after determining the candidate transmission occasion set corresponding to the target serving cell, the terminal reserves and sets the HARQ-ACK bit for each candidate transmission occasion in the candidate transmission occasion set to obtain the HARQ-ACK codebook.

In some implementations, the reserving and setting, by the terminal, a HARQ-ACK bit for each candidate transmission occasion in the candidate transmission occasion set, to obtain the HARQ-ACK codebook includes:

determining, by the terminal, a first quantity of candidate transmission occasions in the candidate transmission occasion set, and determining a second quantity of HARQ-ACK bits corresponding to each candidate transmission occasion in a HARQ-ACK bit sequence corresponding to the HARQ-ACK codebook; and determining a length of the HARQ-ACK bit sequence based on the first quantity and the second quantity, to obtain the HARQ-ACK codebook.

For example, assuming that the candidate transmission occasion set includes M (that is, the first quantity) candidate transmission occasions, and each candidate transmission occasion successively corresponds to N (that is, the second quantity) HARQ-ACK bits in the HARQ-ACK bit sequence corresponding to the codebook, a length value of the HARQ-ACK bit sequence corresponding to the codebook is M×N.

Further, the terminal sets, according to a detected and received PDSCH and a demodulation result thereof, a value of the HARQ-ACK bit corresponding to a candidate transmission occasions corresponding to each PDSCH. For example, the terminal determines a time domain resource assignment record corresponding to each PDSCH, determines a time domain resource assignment record subset of the time domain resource assignment record, determines an equivalent feedback time offset corresponding to each PDSCH, and determines a corresponding HARQ-ACK bit based on the determined time domain resource assignment record subset and a candidate transmission occasion corresponding to the equivalent feedback time offset. Based on this manner, the terminal reserves and sets the HARQ-ACK bit for each candidate transmission occasion in the candidate transmission occasion set, to obtain the HARQ-ACK codebook.

In some implementations, the second quantity is related to at least one of a maximum quantity of code words configured for the target serving cell, a Spatial Bundling configuration, and a Code Block Group (CBG) transmission configuration.

For example, for the example in FIG. 2, the terminal actually schedules three PDSCHs corresponding to rows ((2-7), (0-10), (0-13)) in the time domain resource assignment table. Assuming that only single code word transmission is configured for the target serving cell, and CBG scheduling or feedback is not configured, the second quantity is 1, that is, the HARQ-ACK bit corresponding to each candidate transmission occasion in the HARQ-ACK bit sequence corresponding to the HARQ-ACK codebook is 1. Based on the foregoing descriptions, it may be learned that a quantity of candidate transmission occasions is 3, that is, the first quantity is 3, and the HARQ-ACK codebook includes three bits. Assuming that a first PDSCH and a third PDSCH are decoded correctly, and a second PDSCH fails to be decoded, a bit sequence corresponding to the HARQ-ACK codebook is 101, where 1 indicates that decoding is correct, and 0 indicates that decoding fails.

In some implementations, the method further includes:

before dividing the subset corresponding to each equivalent feedback time offset into the one or more time domain resource assignment record subsets based on time domain overlapping, deleting, by the terminal, a time domain feedback record that conflicts with a semi-static uplink symbol in the subset; or when dividing the subset corresponding to each equivalent feedback time offset into the one or more time domain resource assignment record subsets based on time domain overlapping, deleting, by the terminal, a time domain feedback record that conflicts with a semi-static uplink symbol in the subset.

In an implementation, after the terminal obtains the time domain feedback record set and divides the time domain feedback record set into the plurality of subsets based on the equivalent feedback time offset, and before traversing each equivalent feedback time offset and dividing the subset corresponding to each equivalent feedback time offset into the one or more time domain resource assignment record subsets based on time domain overlapping, the terminal may need to determine whether each time domain feedback record overlaps or conflicts with the semi-static UL symbol. If there is overlapping or conflict, a time domain feedback record that overlaps or conflicts with the semi-static UL symbol is deleted, and then a remaining time domain feedback record in the subset is divided into a time domain resource assignment record subset based on time domain overlapping. If there is no remaining time domain feedback record in the subset, the subset becomes a null set, and the equivalent feedback time offset does not correspond to any time domain resource assignment record subset.

In another implementation, when traversing each equivalent feedback time offset and dividing the subset corresponding to each equivalent feedback time offset into the one or more time domain resource assignment record subsets based on time domain overlapping, the terminal may delete a time domain feedback record that conflicts with the semi-static UL symbol in the subset. For a related operation of the deleted subset, refer to the specific descriptions in the foregoing implementation. Details are not described herein again.

It should be noted that the foregoing implementation in this embodiment of this application may be performed for a scene in which all PDSCHs scheduled by a single piece of DCI feed back a HARQ-ACK on a same PUCCH. That is, a single feedback time offset is indicated in scheduling DCI, and based on a slot or sub-slot in which an end moment of a last PDSCH scheduled by the DCI is located and the indicated feedback time offset, a slot or sub-slot in which a single feedback PUCCH is located may be determined by using all or a part of the foregoing processing procedures.

In some implementations, the method provided in this embodiment of this application may correspond to another application scene. For example, when each PDSCH scheduled by a single piece of DCI may feed back a corresponding HARQ-ACK on a plurality of different PUCCHs, it is assumed that PDSCHs that feed back a corresponding HARQ-ACK on a same PUCCH constitute a PDSCH subset, each PDSCH subset may correspond to one feedback time offset value, and a start reference point employed for the feedback time offset value is an uplink slot or sub-slot in which an end moment of a last PDSCH in the corresponding PDSCH subset is located.

Figure 4:
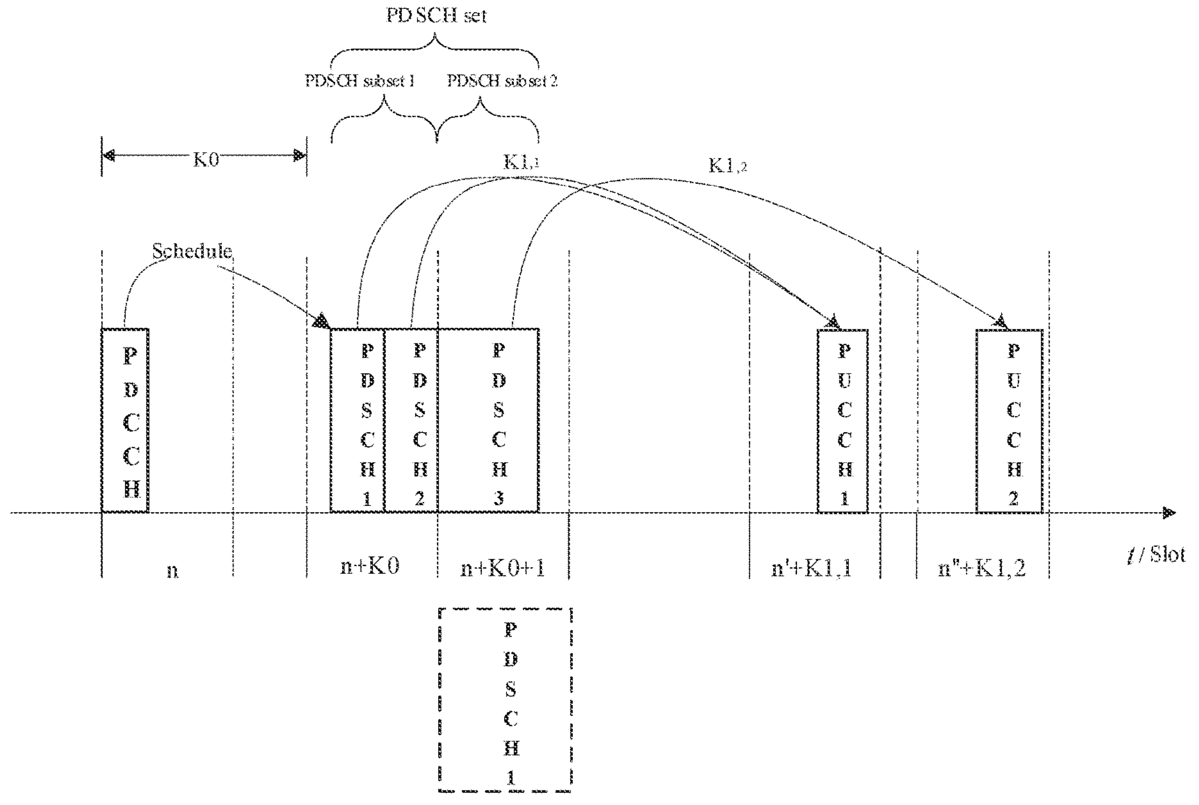
FIG. 4 is a schematic diagram in which a HARQ-ACK is fed back on a plurality of PUCCHs for multi-PDSCH scheduling according to an embodiment of this application.

An example shown in FIG. 4 is a schematic diagram of a scene in which a plurality of PDSCHs scheduled by a single piece of DCI feed back a HARQ-ACK on a plurality of PUCCHs. For the example shown in FIG. 4, it is assumed that a division manner for a PDSCH subset in each row in the time domain resource assignment table is determined, and an indication manner for a feedback time offset of each PDSCH subset is determined. For example, the feedback time offset corresponding to each PDSCH subset is selected from the feedback time offset set configured by the higher layer, or the feedback time offset corresponding to each PDSCH subset is determined based on a value selected from the feedback time offset set configured by the higher layer and some predefined rules. In such an application scene, the method provided in this embodiment of this application may be extended to support the application scene of the example shown in FIG. 4. For example, only step 301 may be extended.

In some implementations, in a case that each PDSCH scheduled by a single piece of DCI feeds back a corresponding HARQ-ACK on a plurality of different PUCCHs, the terminal also needs to first obtain the time domain feedback record set. In some implementations, the terminal traverses all feedback time offsets in the feedback time offset set, traverses all rows or all schedulable rows in the time domain resource assignment table, and traverses all time domain resource assignment records in any row or any schedulable row in the time domain resource assignment table, to obtain the time domain feedback records corresponding to all the initial candidate transmission occasions, so as to obtain the time domain feedback record set. Further, the method further includes:

- performing, by the terminal, PDSCH subset division on a third target row in the time domain resource assignment table to obtain a new row, where all PDSCHs in the PDSCH subset feed back a corresponding HARQ-ACK on a same PUCCH, and one new row corresponds to time domain resource assignment of each PDSCH in one PDSCH subset; and
- adding, by the terminal, the new row to the time domain resource assignment table, to update the time domain resource assignment table; or
- adding, by the terminal, the new row to the time domain resource assignment table, and deleting the third target row, to update the time domain resource assignment table, where the third target row is scheduled through division of the PDSCH subset.

For example, when a feedback time offset corresponding to a specified PDSCH subset can be selected only from the feedback time offset set configured by the higher layer, a row in the time domain resource assignment table only needs to be extended or replaced, and then the terminal traverses all feedback time offsets in the feedback time offset set, traverses all schedulable rows in the updated time domain resource assignment table, and traverses all time domain resource assignment records in any row or any schedulable row in the updated time domain resource assignment table, to obtain the time domain feedback records corresponding to all the initial candidate transmission occasions. A specific implementation process of traversal and a related concept may be described above in this embodiment of this application, and details are not described herein again.

In this implementation, the extending or replacing a row in the time domain resource assignment table may be implemented in the following manner: the terminal divides a PDSCH subset for a specified row (that is, the third target row) in the time domain resource assignment table to obtain a new row. Based on this, the foregoing operation is performed by using each row in the original time domain resource assignment table as the third target row, to obtain one or more new rows.

In some implementations, in a first implementation, if a specified row in the original time domain resource assignment table may be scheduled without PDSCH subset division, that is, all PDSCHs corresponding to the row feed back a corresponding HARQ-ACK on a same PUCCH; and may also be scheduled through PDSCH subset division, so that the terminal adds an obtained new row to the time domain resource assignment table, to update the time domain resource assignment table and obtain the updated time domain resource assignment table. One new row corresponds to time domain resource assignment of each PDSCH included in any PDSCH subset obtained through division.

In some implementations, in a second implementation, if a specified row in the original time domain resource assignment table can be scheduled only through PDSCH subset division, the terminal performs PDSCH subset division on the row to obtain a new row. Then the terminal adds the obtained new row into the original time domain resource assignment table, deletes the row on which PDSCH subset division is performed, and further updates the time domain resource assignment table to obtain the updated time domain resource assignment table.

For example, for the example in FIG. 4, for the foregoing first implementation, the time domain resource assignment table originally includes two rows: (0-13) and (2-7)+(8-13)+(0-10). For (2-7)+(8-13)+(0-10), two new rows: (2-7)+(8-13) and (0-10) may be obtained through PDSCH subset division (that is, all PDSCHs in a PDSCH subset obtained through division feed back a corresponding HARQ-ACK on a same PUCCH). The two new rows are added to the time domain resource assignment table. Further, the updated time domain resource assignment table includes four rows: (0-13), (2-7)+(8-13)+(0-10), (2-7)+(8-13), and (0-10).

It should be noted that after obtaining the updated time domain resource assignment table, the terminal traverses all rows or all schedulable rows in the updated time domain resource assignment table.

In some implementations, in this embodiment of this application, in a case that each PDSCH scheduled by a single piece of DCI feeds back a corresponding HARQ-ACK on a plurality of different PUCCHs, if a feedback time offset corresponding to a specified PDSCH subset is determined through derivation based on a value selected from the feedback time offset set configured by the higher layer and some predefined rules, in addition to various combinations of original feedback time offsets and rows in the time domain resource assignment table, a case that combinations of new rows corresponding to these PDSCH subsets and equivalent feedback time offsets needs to be additionally considered. In some implementations, in such an application scene, the method further includes:

performing, by the terminal, PDSCH subset division on a third target row in the time domain resource assignment table to obtain a new row, where the third target row is scheduled through division of the PDSCH subset, all PDSCHs in the PDSCH subset feed back a corresponding HARQ-ACK on a same PUCCH, and one new row corresponds to time domain resource assignment of each PDSCH in one PDSCH subset; and combining any row in the new rows with a corresponding first feedback time offset, determining a corresponding time domain feedback record, taking a union set of the corresponding time domain feedback records to obtain a new time domain feedback record set, and updating the time domain feedback record set based on the new time domain feedback record set, where the first feedback time offset is a feedback time offset value actually applied when a HARQ-ACK corresponding to the PDSCH subset corresponding to the new row is fed back in the uplink slot.

In an implementation, if a specified row in the time domain resource assignment table may be scheduled without PDSCH subset division, that is, all PDSCHs corresponding to the row feed back a corresponding HARQ-ACK on a same PUCCH; and may also be scheduled through PDSCH subset division, so that the terminal performs PDSCH subset division on a specified row (that is, the third target row) in the time domain resource assignment table to obtain a new row, where one new row corresponds to time domain resource assignment of each PDSCH included in any PDSCH subset obtained through division. The terminal combines any row in the new rows with a corresponding first feedback time offset and determines a corresponding time domain feedback record, where the first feedback time offset is a feedback time offset value actually applied when a HARQ-ACK corresponding to the PDSCH subset corresponding to the new row is fed back in the uplink slot, that is, the first feedback time offset is also an equivalent feedback time offset. Further, the terminal combines any row in the new rows with a corresponding first feedback time offset and takes a union set of the determined time domain feedback records, to obtain a new time domain feedback record set, and takes a union set of the new time domain feedback record set and the original time domain feedback record set for update, to obtain the updated time domain feedback record set. In this case, the dividing, by the terminal, the time domain feedback record set into subsets based on the equivalent feedback time offset includes: dividing, by the terminal, the updated time domain feedback record set into subsets based on the equivalent feedback time offset.

It should be noted that, in another implementation, if a specified row in the time domain resource assignment table can be scheduled only through PDSCH subset division, when obtaining the time domain feedback record set, the terminal needs to ignore output of a corresponding time domain feedback record obtained by combining the row with any feedback time offset, that is, the corresponding time domain feedback record obtained by combining the row with any feedback time offset is not added to the time domain feedback record set.

For example, for the example in FIG. 4, the time domain resource assignment table originally includes two rows: (0-13) and (2-7)+(8-13)+(0-10). For (2-7)+(8-13)+(0-10), two new rows: (2-7)+(8-13) and (0-10) may be obtained through PDSCH subset division (that is, all PDSCHs in a PDSCH subset obtained through division feed back a corresponding HARQ-ACK on a same PUCCH). It is assumed that a K1 indication solution for the PDSCH subset in the example in FIG. 4 is as follows: In scheduling DCI, it is indicated that single K1 is employed for a last PDSCH subset, which successively decreases for preceding PDSCH subsets. Therefore, for the example in FIG. 4, the following combinations: ((2-7)+(8-13), K1-1) and ((0-10), and K1) between the new rows and the equivalent K1 may be obtained. Time domain feedback records corresponding to the two combinations between the new rows and the equivalent K1 are respectively: ((2-7)+(8-13), K1-1): ((2-7), K1-1), ((8-13), K1-1); and ((0-10), K1): ((0-10), K1).

The foregoing obtained time domain feedback records are added to the time domain feedback record set. In this case, the updated time domain feedback record set includes: ((0-13), K1), ((2-7), K1+1), ((8-13), K1+1), ((0-10), K1), ((2-7), K1-1), and ((8-13), K1-1).

Further, in this implementation, for a specific implementation process in which the terminal divides the updated time domain feedback record set into a plurality of subsets based on equivalent feedback time offset(s) and constructs the HARQ-ACK codebook based on the plurality of subsets obtained through division, refer to the foregoing descriptions of the implementation in which all PDSCHs scheduled by a single piece of DCI feed back a HARQ-ACK on a same PUCCH. Details are not described herein again.

In this embodiment of this application, in a case that all PDSCHs scheduled by a single piece DCI feed back a HARQ-ACK on a same PUCCH, when an uplink subcarrier spacing (subcarrier spacing, SCS) is different from a downlink SCS and an uplink u value is less than a preset value, each time domain feedback record in the time domain feedback record set further includes a downlink slot index (DL Slot Index). For example, in this case, the time domain feedback record may be represented as a record (SLIV, DL Slot Index, equivalent K 1), and therefore the time domain feedback record set obtained by the terminal is a set (SLIV, DL Slot Index, equivalent K1). It can be understood that the uplink u value herein corresponds to the uplink SCS.

It can be understood that, in this implementation, the time domain feedback record set obtained by the terminal is different from that in the foregoing implementation. Therefore, in this implementation, a manner in which the time domain feedback record set is divided into subsets based on the equivalent feedback time offset and the HARQ-ACK codebook is constructed based on the subsets obtained through division is different from that in the foregoing implementation. The following is described and illustrated by using specific embodiments.

Figure 5:
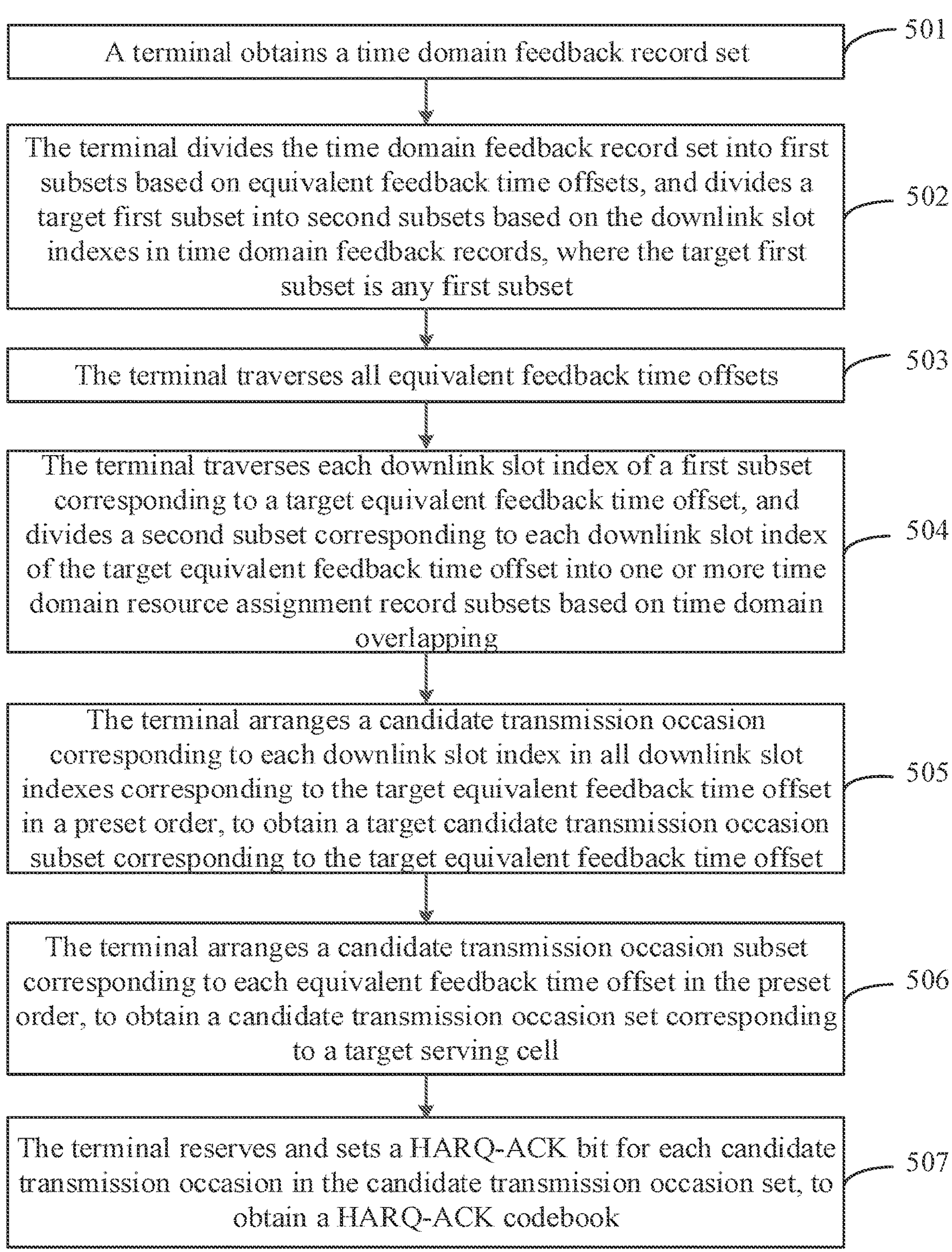
FIG. 5 is a flowchart of another HARQ-ACK codebook construction method according to an embodiment of this application.

Referring to FIG. 5, FIG. 5 is a procedure of another HARQ-ACK codebook construction method according to an embodiment of this application. In this embodiment, all PDSCHs scheduled by a single piece of DCI feed back a HARQ-ACK on a same PUCCH, an uplink SCS is different from a downlink SCS, and an uplink u value is less than a preset value. As shown in FIG. 5, the method includes the following steps.

Step 501. A terminal obtains a time domain feedback record set.

Each time domain feedback record in the time domain feedback record set includes a time domain resource assignment record, a downlink slot index, and an equivalent feedback time offset corresponding to the time domain resource assignment record, and the equivalent feedback time offset is a feedback time offset value actually applied when a HARQ-ACK for the time domain resource assignment record corresponding to the equivalent feedback time offset is fed back in an uplink slot or sub-slot. For example, the time domain feedback record set is a set (SLIV, DL slot index, equivalent K1). The downlink slot may be another time unit, for example, a sub-slot. The downlink slot in the implementations of this application may be understood based on this interpretation, and details are not described later.

In some implementations, the terminal may traverse all feedback time offsets in a feedback time offset set, traverse all rows or all schedulable rows in a time domain resource assignment table, and traverse all time domain resource assignment records in any row or any schedulable row in the time domain resource assignment table, to obtain time domain feedback records corresponding to all initial candidate transmission occasions. For a specific implementation process thereof, refer to the descriptions of the foregoing embodiment in FIG. 3. Details are not described herein again.

It should be noted that in the foregoing embodiment shown in FIG. 3, when the terminal determines a set (SLIV, equivalent K1), because the single equivalent K 1 may actually correspond to a plurality of downlink slots, when a record (SLID; equivalent K1) is being collected, a specific downlink slot corresponding to an SLIV in a specified record needs to be determined, and the record (SLIV, equivalent K1) may be extended to a record (SLIV, DL slot index, equivalent K1).

The DL slot index is used to determine a local index of a downlink slot corresponding to an SLIV in N downlink slots corresponding to an uplink slot corresponding to the equivalent K1, where N is determined based on a difference between uplink and downlink SCSs or u values. In N downlink slots corresponding to a specified uplink slot, a first downlink slot is aligned based on a start moment and a last downlink slot is aligned based on an end moment. In some implementations, a value of the DL slot index is 0–(N−1).

Step 502: The terminal divides the time domain feedback record set into first subsets based on equivalent feedback time offsets, and divides a target first subset into second subsets based on the downlink slot indexes in time domain feedback records, where the target first subset is any first subset.

It can be understood that, in this embodiment, each time domain feedback record includes a time domain resource assignment record, a downlink slot index, and an equivalent feedback time offset corresponding to the time domain resource assignment record, for example, may be represented as a record (SLIV, DL slot index, equivalent K1). The terminal first divides an obtained time domain feedback record into first subsets based on equivalent feedback time offsets, and then divides the time domain feedback record into second subsets based on the downlink slot indexes within a subset corresponding to a specified first subset (that is, the target first subset), so that second subsets corresponding to a part or all of downlink slot indexes of the equivalent feedback time offsets are obtained.

Step 503: The terminal traverses all equivalent feedback time offsets.

Step 504: The terminal traverses all downlink slot indexes of a first subset corresponding to a target equivalent feedback time offset, and divides a second subset corresponding to each downlink slot index of the target equivalent feedback time offset into one or more time domain resource assignment record subsets based on time domain overlapping.

Each time domain resource assignment record subset corresponds to one candidate transmission occasion, and the target equivalent feedback time offset is any equivalent feedback time offset.

In some implementations, for a specified equivalent feedback time offset (that is, the target equivalent feedback time offset), the terminal traverses all downlink slot indexes of a first subset corresponding to the equivalent feedback time offset. For a specified downlink slot index, a second subset corresponding to the downlink slot index is divided into one or more time domain resource assignment record subsets based on time domain overlapping, and each time domain resource assignment record subset corresponds to one candidate transmission occasion. The terminal traverses all equivalent feedback time offsets and each downlink slot index in a first subset corresponding to each equivalent feedback time offset in this manner, to obtain a plurality of time domain resource assignment record subsets.

It should be noted that before a second subset corresponding to a specified downlink slot index is divided into one or more time domain resource assignment record subsets based on time domain overlapping, all time domain feedback records that overlap or conflict with a semi-static UL symbol further need to be deleted, so that the terminal traverses an equivalent feedback time offset and a downlink slot index based on a remaining time domain feedback record in the time domain feedback record set, to obtain a plurality of time domain resource assignment record subsets through overlapping.

Step 505: The terminal arranges a candidate transmission occasion corresponding to each downlink slot index in all downlink slot indexes corresponding to the target equivalent feedback time offset in a preset order, to obtain a target candidate transmission occasion subset corresponding to the target equivalent feedback time offset.

For example, after obtaining one or more candidate transmission occasions corresponding to each downlink slot index in all downlink slot indexes corresponding to a specified equivalent feedback time offset, the terminal cascades the one or more candidate transmission occasions in a head-to-tail manner in a preset order, to obtain a target candidate transmission occasion subset corresponding to the equivalent feedback time offset.

Step 506: The terminal arranges a candidate transmission occasion subset corresponding to each equivalent feedback time offset in the preset order, to obtain a candidate transmission occasion set corresponding to a target serving cell.

In this embodiment of this application, after obtaining a target candidate transmission occasion subset corresponding to each equivalent feedback time offset, the terminal arranges the candidate transmission occasion subset corresponding to each equivalent feedback time offset in the preset order, for example, cascades the candidate transmission occasion subset corresponding to each equivalent feedback time offset in a head-to-tail manner in a preset order, to obtain the candidate transmission occasion set corresponding to the target serving cell.

In some implementations, when the candidate transmission occasion set is being determined, each equivalent feedback time offset may be arranged in a descending order or an ascending order, and then a candidate transmission occasion subset corresponding to each equivalent feedback time offset is successively concatenated in a head-to-tail manner in an order of equivalent feedback time offsets. Each downlink slot index corresponding to a single equivalent feedback time offset may be arranged in a descending order or an ascending order, and then one or more candidate transmission occasions corresponding to each downlink slot index are successively concatenated n a head-to-tail manner in an order of downlink slot indexes. When a single downlink slot index corresponds to a plurality of candidate transmission occasions, the candidate transmission occasions are arranged in a preset order, for example, an operation output order in an existing protocol. An ending symbol with an earliest SLIV in ending symbols in an SLIV subset corresponding to a candidate transmission occasion is used as an ending symbol of the candidate transmission occasion, and the candidate transmission occasions are arranged in an order of ending symbols of the candidate transmission occasions.

Step 507: The terminal reserves and sets a HARQ-ACK bit for each candidate transmission occasion in the candidate transmission occasion set, to obtain a HARQ-ACK codebook.

In this embodiment, after obtaining the candidate transmission occasion set corresponding to the target serving cell, the terminal reserves and sets the HARQ-ACK bit for each candidate transmission occasion in the candidate transmission occasion set to obtain the HARQ-ACK codebook. For a specific implementation process of this step, refer to the descriptions of the foregoing embodiment in FIG. 3. Details are not described in this embodiment.

In this embodiment of this application, a terminal defines an equivalent feedback time offset based on a feedback time offset value actually applied when a HARQ-ACK corresponding to a time domain resource assignment record is fed back in an uplink slot. In addition, a downlink slot index in a time domain feedback record set is also considered. Therefore, a time domain feedback record set obtained by the terminal is a time domain feedback record set that can be actually scheduled, and a HARQ-ACK codebook is constructed based on the time domain feedback record set that can be actually scheduled. In this way, it can be ensured that only a HARQ-ACK bit corresponding to a candidate transmission occasion that can be actually scheduled exists in the constructed codebook, thereby avoiding a redundant HARQ-ACK bit in the codebook and effectively reducing overheads of the terminal.

It should be noted that, the HARQ-ACK codebook construction method provided in the embodiments of this application may be performed by a HARQ-ACK codebook construction apparatus, or a control module that is in the HARQ-ACK codebook construction apparatus and that is configured to perform the HARQ-ACK codebook construction method. In the embodiments of this application, an example in which the HARQ-ACK codebook construction apparatus performs the HARQ-ACK codebook construction method is used to describe the HARQ-ACK codebook construction apparatus provided in the embodiments of this application.

Referring to FIG. 6, FIG. 6 is a structural diagram of a HARQ-ACK codebook construction apparatus according to an embodiment of this application. As shown in FIG. 6, the HARQ-ACK codebook construction apparatus 600 includes:

a first obtaining module 601, configured to obtain a time domain feedback record set, where each time domain feedback record in the time domain feedback record set includes a time domain resource assignment record and an equivalent feedback time offset corresponding to the time domain resource assignment record, and the equivalent feedback time offset is a feedback time offset value actually applied when a HARQ-ACK for the time domain resource assignment record corresponding to the equivalent feedback time offset is fed back in an uplink slot;

a first division module 602, configured to divide the time domain feedback record set into a plurality of subsets based on equivalent feedback time offset(s), where each equivalent feedback time offset corresponds to one subset; and a constructing module 603, configured to construct a HARQ-ACK codebook based on the plurality of subsets obtained through division, to perform feedback in the uplink slot.

In some implementations, the first obtaining module 601 is further configured to:

collect time domain feedback records corresponding to all initial candidate transmission occasions that are possibly scheduled, to obtain the time domain feedback record set.

In some implementations, the first obtaining module 601 is further configured to:

traverse all feedback time offsets in a feedback time offset set, traverse all rows or all schedulable rows in a time domain resource assignment table, and traverse all time domain resource assignment records in any row or any schedulable row in the time domain resource assignment table, to obtain the time domain feedback records corresponding to all the initial candidate transmission occasions.

In some implementations, the first obtaining module 601 is further configured to:

for a target feedback time offset and a first target row, assume that HARQ-ACK information corresponding to one piece of DCI is fed back in the HARQ-ACK codebook based on the target feedback time offset and one or more PDSCHs scheduled by the first target row, and traverse all time domain resource assignment records of the first target row, to determine one or more time domain feedback records corresponding to the pair of the target feedback time offset and the first target row; and take a union set of the obtained time domain feedback records, to obtain the time domain feedback record set corresponding to all the initial candidate transmission occasions, where the target feedback time offset is any feedback time offset obtained by traversing the feedback time offset set, the first target row is any row or any schedulable row obtained by traversing the time domain resource assignment table based on the target feedback time offset, and one PDSCH in the one or more scheduled PDSCHs corresponds to one initial candidate transmission occasion and one time domain feedback record.

In some implementations, the equivalent feedback time offset is determined based on the target feedback time offset and a target time domain offset, and the target time domain offset is a time domain offset between a slot in which an end moment of a time domain resource assignment record corresponding to the equivalent feedback time offset is located and a slot in which an end moment of a last time domain resource assignment record in the first target row is located.

In some implementations, in a case that the apparatus has determined a feedback time offset, the schedulable row is determined in the following manner:

in a case that the uplink slot in which transmission of the HARQ-ACK codebook is located is determined, assuming, by the apparatus, that a second target row employs the determined feedback time offset, and if a PDSCH corresponding to each time domain resource assignment record configured in the second target row does not conflict with any semi-static uplink symbol, determining the second target row as a schedulable row, where the second target row is any row in the time domain resource assignment table.

In some implementations, the first obtaining module 601 is further configured to:

determine, based on a determined feedback time offset in the feedback time offset set, each row in the time domain resource assignment table is a schedulable row; and delete a row that is in the time domain resource assignment table and is not a schedulable row, and traverse the determined schedulable row.

In some implementations, the first obtaining module 601 is further configured to:

traverse all rows in the time domain resource assignment table based on a determined feedback time offset in the feedback time offset set.

In some implementations, in a case that each PDSCH scheduled by a single piece of DCI feeds back a corresponding HARQ-ACK on a plurality of different PUCCHs, the apparatus further includes a first updating module, and the first updating module is configured to:

perform PDSCH subset division on a third target row in the time domain resource assignment table to obtain a new row, where all PDSCHs in the PDSCH subset feed back a corresponding HARQ-ACK on a same PUCCH, and one new row corresponds to time domain resource assignment of each PDSCH in one PDSCH subset; and add the new row to the time domain resource assignment table, to update the time domain resource assignment table; or add the new row to the time domain resource assignment table, and delete the third target row, to update the time domain resource assignment table, where the third target row is scheduled through division of the PDSCH subset; and the first obtaining module 601 is further configured to:

traverse all rows or all schedulable rows in the updated time domain resource assignment table.

In some implementations, in a case that each PDSCH scheduled by a single piece of DCI feeds back a corresponding HARQ-ACK on a plurality of different PUCCHs, the apparatus further includes a second updating module, and the second updating module is configured to:

perform PDSCH subset division on a third target row in the time domain resource assignment table to obtain a new row, where the third target row is scheduled through division of the PDSCH subset, all PDSCHs in the PDSCH subset feed back a corresponding HARQ-ACK on a same PUCCH, and one new row corresponds to time domain resource assignment of each PDSCH in one PDSCH subset; and combine any row in the new rows with a corresponding first feedback time offset, determine a corresponding time domain feedback record, take a union set of the corresponding time domain feedback records to obtain a new time domain feedback record set, and update the time domain feedback record set based on the new time domain feedback record set, where the first feedback time offset is a feedback time offset value actually applied when a HARQ-ACK corresponding to the PDSCH subset corresponding to the new row is fed back in the uplink slot; and the first division module 602 is further configured to:

divide the updated time domain feedback record set into subsets based on the equivalent feedback time offset.

In some implementations, the first division module 602 is further configured to perform at least one of the following:

determining an equivalent feedback time offset set, and traversing, based on a target equivalent feedback time offset, a time domain feedback record that is in the time domain feedback record set and that matches the target equivalent feedback time offset, to divide the time domain feedback record set into subsets, where the target equivalent feedback time offset is any equivalent feedback time offset in the equivalent feedback time offset set; and traversing the time domain feedback record set, and in a case that there is a target subset corresponding to an equivalent feedback time offset corresponding to a target time domain feedback record in the time domain feedback record set, classifying the target time domain feedback record into the target subset, and in a case that there is no target subset corresponding to the equivalent feedback time offset corresponding to the target time domain feedback record, establishing a target subset corresponding to the target time domain feedback record, and classifying the target time domain feedback record into the target subset.

In some implementations, the constructing module 603 includes:

a determining unit, configured to determine a candidate transmission occasion set corresponding to a target serving cell based on the plurality of subsets obtained through division; and a constructing unit, configured to reserve and set a HARQ-ACK bit for each candidate transmission occasion in the candidate transmission occasion set, to obtain the HARQ-ACK codebook.

In some implementations, the determining unit is further configured to:

traverse all equivalent feedback time offsets, and divide a subset corresponding to each equivalent feedback time offset into one or more time domain resource assignment record subsets based on time domain overlapping, where each time domain resource assignment record subset corresponds to one candidate transmission occasion; and arrange a candidate transmission occasion corresponding to each equivalent feedback time offset in a preset order, to obtain the candidate transmission occasion set corresponding to the target serving cell.

In some implementations, the apparatus further includes a deletion module, and the deletion module is configured to:

before the subset corresponding to each equivalent feedback time offset is divided into the one or more time domain resource assignment record subsets based on time domain overlapping, delete a time domain feedback record that conflicts with a semi-static uplink symbol in the subset; or when the subset corresponding to each equivalent feedback time offset is divided into the one or more time domain resource assignment record subsets based on time domain overlapping, delete a time domain feedback record that conflicts with a semi-static uplink symbol in the subset.

In some implementations, the constructing unit is further configured to:

determine a first quantity of candidate transmission occasions in the candidate transmission occasion set, and determine a second quantity of HARQ-ACK bits corresponding to each candidate transmission occasion in a HARQ-ACK bit sequence corresponding to the HARQ-ACK codebook; and determine a length of the HARQ-ACK bit sequence based on the first quantity and the second quantity, to obtain the HARQ-ACK codebook.

In some implementations, the second quantity is associated with at least one of a maximum quantity of code words configured for the target serving cell, a spatial bundling configuration, and a Code Block Group (CBG) transmission configuration.

In some implementations, in a case that each PDSCH scheduled by a single piece of DCI feeds back a corresponding HARQ-ACK on a same PUCCH, an uplink subcarrier spacing SCS is different from a downlink SCS, and an uplink U value is less than a preset value, each time domain feedback record in the time domain feedback record set further includes a downlink slot index;

the first division module 602 is further configured to:

divide the time domain feedback record set into first subsets based on equivalent feedback time offsets, and divide a target first subset into second subsets based on the downlink slot indexes in time domain feedback records, where the target first subset is any first subset; and the constructing module 603 is further configured to:

traverse all equivalent feedback time offsets;

traverse all downlink slot indexes of a first subset corresponding to a target equivalent feedback time offset, and divide a second subset corresponding to each downlink slot index of the target equivalent feedback time offset into one or more time domain resource assignment record subsets based on time domain overlapping, where each time domain resource assignment record subset corresponds to one candidate transmission occasion, and the target equivalent feedback time offset is any equivalent feedback time offset;

arrange a candidate transmission occasion corresponding to each downlink slot index in all downlink slot indexes corresponding to the target equivalent feedback time offset in a preset order, to obtain a target candidate transmission occasion subset corresponding to the target equivalent feedback time offset;

arrange a candidate transmission occasion subset corresponding to each equivalent feedback time offset in the preset order, to obtain a candidate transmission occasion set corresponding to a target serving cell; and reserve and set a HARQ-ACK bit for each candidate transmission occasion in the candidate transmission occasion set, to obtain the HARQ-ACK codebook.

In some implementations, the apparatus includes:

a sending module, configured to send the HARQ-ACK codebook in the uplink slot.

In this embodiment of this application, the HARQ-ACK codebook construction apparatus 600 defines an equivalent feedback time offset based on a feedback time offset value actually applied when a HARQ-ACK corresponding to a time domain resource assignment record is fed back in an uplink slot. Therefore, a time domain feedback record set obtained by the apparatus is a time domain feedback record set that can be actually scheduled, and a HARQ-ACK codebook is constructed based on the time domain feedback record set that can be actually scheduled. In this way, it can be ensured that only a HARQ-ACK bit corresponding to a candidate transmission occasion that can be actually scheduled exists in the constructed codebook, thereby avoiding a redundant HARQ-ACK bit in the codebook and effectively reducing overheads of the apparatus.

The HARQ-ACK codebook construction apparatus 600 in this embodiment of this application may be an apparatus, an apparatus or an electronic device with an operating system, or may be a component, an integrated circuit, or a chip in a terminal. The apparatus or the electronic device may be a mobile terminal, or a non-mobile terminal. For example, the mobile terminal may include but is not limited to the types of the terminal 11 listed above, and the non-mobile terminal may be a server, a Network Attached Storage (NAS), a personal computer, a television, an automated teller machine, or a self-service machine. This is not specifically limited in the embodiments of this application.

The HARQ-ACK codebook construction apparatus 600 provided in this embodiment of this application can implement the processes implemented in the method embodiment shown in FIG. 3 or FIG. 5 and achieve a same technical effect. To avoid repetition, details are not described herein again.

An embodiment of this application further provides a HARQ-ACK codebook transmission method. Referring to FIG. 7, FIG. 7 is a flowchart of a HARQ-ACK codebook transmission method according to an embodiment of this application. As shown in FIG. 7, the method includes the following steps.

Step 701: A network side device receives and parses a HARQ-ACK codebook sent by a terminal.

The HARQ-ACK codebook is constructed based on a plurality of subsets obtained through division obtained by obtaining a time domain feedback record set and dividing the time domain feedback record set into the plurality of subsets by the terminal.

In this embodiment of this application, the network side device receives the HARQ-ACK codebook sent by the terminal, and parses the HARQ-ACK codebook to obtain a HARQ-ACK bit. The HARQ-ACK codebook is constructed based on the plurality of subsets obtained through division obtained by obtaining the time domain feedback record set and dividing the time domain feedback record set into the plurality of subsets by the terminal based on an equivalent feedback time offset. For a specific implementation process in which the terminal performs HARQ-ACK codebook construction, refer to the specific descriptions of the foregoing HARQ-ACK codebook construction method embodiment. Details are not described in this embodiment.

It should be noted that, in the time domain feedback record set obtained by the terminal by constructing the codebook, each time domain feedback record includes a time domain resource assignment record and an equivalent feedback time offset corresponding to the time domain resource assignment record, and the equivalent feedback time offset is a feedback time offset value actually applied when a HARQ-ACK for the time domain resource assignment record corresponding to the equivalent feedback time offset is fed back in an uplink slot. Therefore, the time domain feedback record set obtained by the terminal is a time domain feedback record set that can be actually scheduled, and the HARQ-ACK codebook is constructed based on the time domain feedback record set that can be actually scheduled. In this way, it can be ensured that only a bit corresponding to a candidate transmission occasion that can be actually scheduled exists in the constructed codebook, thereby avoiding a redundant HARQ-ACK bit in the codebook. Further, there is no redundancy bit in the HARQ-ACK codebook received by the network side device, thereby reducing overheads of the network side device.

In some implementations, before step 701, the method further includes:

obtaining, by the network side device, a time domain feedback record set, where each time domain feedback record in the time domain feedback record set includes a time domain resource assignment record and an equivalent feedback time offset corresponding to the time domain resource assignment record, and the equivalent feedback time offset is a feedback time offset value actually applied when a HARQ-ACK for the time domain resource assignment record corresponding to the equivalent feedback time offset is fed back in an uplink slot;

dividing, by the network side device, the time domain feedback record set into a plurality of subsets based on equivalent feedback time offset(s), where each equivalent feedback time offset corresponds to one subset; and determining, by the network side device based on the plurality of subsets obtained through division, a length of a HARQ-ACK bit sequence corresponding to the HARQ-ACK codebook, and a mapping relationship between a bit in the HARQ-ACK bit sequence and each subset in the plurality of subsets.

In this embodiment of this application, the network side device can also obtain a time domain feedback record set, and can divide the time domain feedback record set into a plurality of subsets based on an equivalent feedback time offset. A time domain feedback record includes a time domain resource assignment record and an equivalent feedback time offset corresponding to the time domain resource assignment record, for example, performance behavior (SLIV, equivalent K1) of the time domain feedback record. For a specified (SLIV, equivalent K1), the SLIV corresponds to a specified SLIV in an indicated row in a time domain resource assignment table, and the equivalent K1 is a K1 value actually applied when a HARQ-ACK corresponding to the SLIV is fed back in an uplink slot or sub-slot, where the uplink slot or sub-slot is an uplink slot or sub-slot in which transmission of a HARQ-ACK codebook is located.

It should be noted that, after dividing the time domain feedback record set into the plurality of subsets, the network side device determines, based on the plurality of subsets obtained through division, a length of a HARQ-ACK bit sequence corresponding to the HARQ-ACK codebook sent by the terminal, and a mapping relationship between a bit in the HARQ-ACK bit sequence and each subset in the plurality of subsets obtained through division. Further, after receiving the HARQ-ACK codebook sent by the terminal and obtaining the HARQ-ACK bit sequence through parsing, the network side device can further determine a subset corresponding to the HARQ-ACK codebook based on the determined mapping relationship between the HARQ-ACK bit sequence and each subset, and obtain information such as an equivalent feedback time offset and a time domain resource assignment record according to the determined subset. In this embodiment of this application, the obtaining, by the network side device, a time domain feedback record set includes:

collecting, by the network side device, time domain feedback records corresponding to all initial candidate transmission occasions that are possibly scheduled, to obtain the time domain feedback record set.

In some implementations, the collecting, by the network side device, time domain feedback records corresponding to all initial candidate transmission occasions that are possibly scheduled includes:

traversing, by the network side device, all feedback time offsets in a feedback time offset set, traversing all rows or all schedulable rows in a time domain resource assignment table, and traversing all time domain resource assignment records in any row or any schedulable row in the time domain resource assignment table, to obtain the time domain feedback records corresponding to all the initial candidate transmission occasions.

In some implementations, a traversal process of the network side device includes:

for a target feedback time offset and a first target row, assuming, by the network side device, that HARQ-ACK information corresponding to one piece of DCI is fed back in the HARQ-ACK codebook based on the target feedback time offset and one or more PDSCHs scheduled by the first target row, and traversing all time domain resource assignment records of the first target row, to determine one or more time domain feedback records corresponding to the pair of the target feedback time offset and the first target row; and taking, by the network side device, a union set of the obtained time domain feedback records, to obtain the time domain feedback record set corresponding to all the initial candidate transmission occasions, where the target feedback time offset is any feedback time offset obtained by traversing the feedback time offset set, the first target row is any row or any schedulable row obtained by traversing the time domain resource assignment table based on the target feedback time offset, and one PDSCH in the one or more scheduled PDSCHs corresponds to one initial candidate transmission occasion and one time domain feedback record.

It should be noted that, for a specific implementation solution of the traversal process of the foregoing network side device, refer to the behavior of the terminal side in the foregoing HARQ-ACK codebook construction method embodiment. A difference between this embodiment of this application and the foregoing HARQ-ACK codebook construction method lies in that the execution body is a network side device, and a specific implementation process is not described herein again.

In some implementations, the equivalent feedback time offset is determined based on the target feedback time offset and a target time domain offset, and the target time domain offset is a time domain offset between a slot in which an end moment of a time domain resource assignment record corresponding to the equivalent feedback time offset is located and a slot in which an end moment of a last time domain resource assignment record in the first target row is located.

In some implementations, in a case that the network side device has determined a feedback time offset, the schedulable row is determined in the following manner:

in a case that the uplink slot in which transmission of the HARQ-ACK codebook is located is determined, assuming, by the network side device, that a second target row employs the determined feedback time offset, and if a PDSCH corresponding to each time domain resource assignment record configured in the second target row does not conflict with any semi-static uplink symbol, determining the second target row as a schedulable row, where the second target row is any row in the time domain resource assignment table.

In some implementations, the traversing, by the network side device, a schedulable row in a time domain resource assignment table includes:

determining, by the network side device based on a determined feedback time offset in the feedback time offset set, each row in the time domain resource assignment table is a schedulable row; and deleting, by the network side device, a row that is in the time domain resource assignment table and is not a schedulable row, and traversing the determined schedulable row.

In some implementations, the traversing, by the network side device, a row in a time domain resource assignment table includes:

traversing, by the network side device, each row in the time domain resource assignment table based on a determined feedback time offset in the feedback time offset set.

In some implementations, in a case that each PDSCH scheduled by a single piece of DCI feeds back a corresponding HARQ-ACK on a plurality of different PUCCHs, the method further includes:

performing, by the network side device, PDSCH subset division on a third target row in the time domain resource assignment table to obtain a new row, where all PDSCHs in the PDSCH subset feed back a corresponding HARQ-ACK on a same PUCCH, and one new row corresponds to time domain resource assignment of each PDSCH in one PDSCH subset; and adding, by the network side device, the new row to the time domain resource assignment table, to update the time domain resource assignment table; or adding, by the network side device, the new row to the time domain resource assignment table, and deleting the third target row, to update the time domain resource assignment table, where the third target row is scheduled through division of the PDSCH subset; and the traversing, by the network side device, all rows or all schedulable rows in a time domain resource assignment table includes:

traversing, by the network side device, a row or a schedulable row in the updated time domain resource assignment table.

In some implementations, in a case that each PDSCH scheduled by a single piece of DCI feeds back a corresponding HARQ-ACK on a plurality of different PUCCHs, the method further includes:

performing, by the network side device, PDSCH subset division on a third target row in the time domain resource assignment table to obtain a new row, where the third target row is scheduled through division of the PDSCH subset, all PDSCHs in the PDSCH subset feed back a corresponding HARQ-ACK on a same PUCCH, and one new row corresponds to time domain resource assignment of each PDSCH in one PDSCH subset; and combining any row in the new rows with a corresponding first feedback time offset, determining a corresponding time domain feedback record, taking a union set of the corresponding time domain feedback records to obtain a new time domain feedback record set, and updating the time domain feedback record set based on the new time domain feedback record set, where the first feedback time offset is a feedback time offset value actually applied when a HARQ-ACK corresponding to the PDSCH subset corresponding to the new row is fed back in the uplink slot; and the dividing, by the network side device, the time domain feedback record set into subsets based on the equivalent feedback time offset includes:

divide, by the network side device, the updated time domain feedback record set into subsets based on the equivalent feedback time offset.

In some implementations, the dividing, by the network side device, the time domain feedback record set into a plurality of subsets based on equivalent feedback time offset(s) includes any one of the following:

determining, by the network side device, an equivalent K1 set, and traversing, based on target equivalent K1, a time domain feedback record that is in the time domain feedback record set and that matches the target equivalent feedback time offset, to divide the time domain feedback record set into subsets, where the target equivalent feedback time offset is any equivalent feedback time offset in the equivalent feedback time offset set; and traversing, by the network side device, the time domain feedback record set, and in a case that there is a target subset corresponding to an equivalent feedback time offset corresponding to a target time domain feedback record in the time domain feedback record set, classifying the target time domain feedback record into the target subset, and in a case that there is no target subset corresponding to the equivalent feedback time offset corresponding to the target time domain feedback record, establishing a target subset corresponding to the target time domain feedback record, and classifying the target time domain feedback record into the target subset.

In some implementations, the method further includes:

deleting, by the network side device, a time domain feedback record that conflicts with a semi-static uplink symbol in the subset.

It should be noted that, for specific implementation solutions of the foregoing optional implementations, refer to the behavior of the terminal side in the foregoing HARQ-ACK codebook construction method embodiment. This embodiment of this application differs from the foregoing HARQ- ACK codebook construction method in that the execution body is a network side device, and a specific implementation process is not described herein again.

It should be noted that, the HARQ-ACK codebook transmission method provided in the embodiments of this application may be performed by a HARQ-ACK codebook transmission apparatus, or a control module that is in the HARQ-ACK codebook transmission apparatus and that is configured to perform the HARQ-ACK codebook transmission method. In the embodiments of this application, an example in which the HARQ-ACK codebook transmission apparatus performs the HARQ-ACK codebook transmission method is used to describe the HARQ-ACK codebook transmission apparatus provided in the embodiments of this application.

Referring to FIG. 8, FIG. 8 is a structural diagram of a HARQ-ACK codebook transmission apparatus according to an embodiment of this application. As shown in FIG. 8, the HARQ-ACK codebook transmission apparatus 800 includes:

a parsing module 801, configured to receive and parse a HARQ-ACK codebook sent by a terminal, where the HARQ-ACK codebook is constructed based on a plurality of subsets obtained through division obtained by obtaining a time domain feedback record set and dividing the time domain feedback record set into the plurality of subsets by the terminal.

In some implementations, the apparatus further includes:

a second obtaining module, configured to obtain a time domain feedback record set, where each time domain feedback record in the time domain feedback record set includes a time domain resource assignment record and an equivalent feedback time offset corresponding to the time domain resource assignment record, and the equivalent feedback time offset is a feedback time offset value actually applied when a HARQ-ACK for the time domain resource assignment record corresponding to the equivalent feedback time offset is fed back in an uplink slot;

a second division module, configured to divide the time domain feedback record set into a plurality of subsets based on equivalent feedback time offset(s), where each equivalent feedback time offset corresponds to one subset; and a determining module, configured to determine, based on the plurality of subsets obtained through division, a length of a HARQ-ACK bit sequence corresponding to the HARQ-ACK codebook, and a mapping relationship between a bit in the HARQ-ACK bit sequence and each subset in the plurality of subsets.

In some implementations, the second obtaining module is further configured to:

collect time domain feedback records corresponding to all initial candidate transmission occasions that are possibly scheduled, to obtain the time domain feedback record set.

In some implementations, the second obtaining module is further configured to:

traverse all feedback time offsets in a feedback time offset set, traverse all rows or all schedulable rows in a time domain resource assignment table, and traverse all time domain resource assignment records in any row or any schedulable row in the time domain resource assignment table, to obtain the time domain feedback records corresponding to all the initial candidate transmission occasions.

In some implementations, the equivalent feedback time offset is determined based on the target feedback time offset and a target time domain offset, and the target time domain offset is a time domain offset between a slot in which an end moment of a time domain resource assignment record corresponding to the equivalent feedback time offset is located and a slot in which an end moment of a last time domain resource assignment record in the first target row is located.

In some implementations, in a case that the apparatus has determined a feedback time offset, the schedulable row is determined in the following manner:

in a case that the uplink slot in which transmission of the HARQ-ACK codebook is located is determined, assuming, by the apparatus, that a second target row employs the determined feedback time offset, and if a PDSCH corresponding to each time domain resource assignment record configured in the second target row does not conflict with any semi-static uplink symbol, determining the second target row as a schedulable row, where the second target row is any row in the time domain resource assignment table.

In some implementations, the second obtaining module is further configured to:

determine, based on a determined feedback time offset in the feedback time offset set, each row in the time domain resource assignment table is a schedulable row; and delete a row that is in the time domain resource assignment table and is not a schedulable row, and traverse the determined schedulable row.

In some implementations, the second obtaining module is further configured to:

traverse all rows in the time domain resource assignment table based on a determined feedback time offset in the feedback time offset set.

In some implementations, in a case that each PDSCH scheduled by a single piece of DCI feeds back a corresponding HARQ-ACK on a plurality of different PUCCHs, the apparatus is further configured to:

perform PDSCH subset division on a third target row in the time domain resource assignment table to obtain a new row, where all PDSCHs in the PDSCH subset feed back a corresponding HARQ-ACK on a same PUCCH, and one new row corresponds to time domain resource assignment of each PDSCH in one PDSCH subset; and add the new row to the time domain resource assignment table, to update the time domain resource assignment table; or add the new row to the time domain resource assignment table, and delete the third target row, to update the time domain resource assignment table, where the third target row is scheduled through division of the PDSCH subset; and the second obtaining module is further configured to:

traverse all rows or all schedulable rows in the updated time domain resource assignment table.

In some implementations, in a case that each PDSCH scheduled by a single piece of DCI feeds back a corresponding HARQ-ACK on a plurality of different PUCCHs, the apparatus is further configured to:

perform PDSCH subset division on a third target row in the time domain resource assignment table to obtain a new row, where the third target row is scheduled through division of the PDSCH subset, all PDSCHs in the PDSCH subset feed back a corresponding HARQ- ACK on a same PUCCH, and one new row corresponds to time domain resource assignment of each PDSCH in one PDSCH subset; and combine any row in the new rows with a corresponding first feedback time offset, determine a corresponding time domain feedback record, take a union set of the corresponding time domain feedback records to obtain a new time domain feedback record set, and update the time domain feedback record set based on the new time domain feedback record set, where the first feedback time offset is a feedback time offset value actually applied when a HARQ-ACK corresponding to the PDSCH subset corresponding to the new row is fed back in the uplink slot; and the second division module is further configured to:

divide the updated time domain feedback record set into subsets based on the equivalent feedback time offset.

In some implementations, the second division module is further configured to perform at least one of the following:

determine an equivalent K1 set, and traversing, based on target equivalent K1, a time domain feedback record that is in the time domain feedback record set and that matches the target equivalent feedback time offset, to divide the time domain feedback record set into subsets, where the target equivalent feedback time offset is any equivalent feedback time offset in the equivalent feedback time offset set; and traverse the time domain feedback record set, and in a case that there is a target subset corresponding to an equivalent feedback time offset corresponding to a target time domain feedback record in the time domain feedback record set, classify the target time domain feedback record into the target subset, and in a case that there is no target subset corresponding to the equivalent feedback time offset corresponding to the target time domain feedback record, establish a target subset corresponding to the target time domain feedback record, and classify the target time domain feedback record into the target subset.

In some implementations, the apparatus further includes a deletion module, configured to:

delete a time domain feedback record that conflicts with a semi-static uplink symbol in the subset.

The HARQ-ACK codebook transmission apparatus provided in this embodiment of this application can implement the processes implemented in the method embodiment in FIG. 7, and achieve a same technical effect. To avoid repetition, details are not described herein again.

Figure 9:
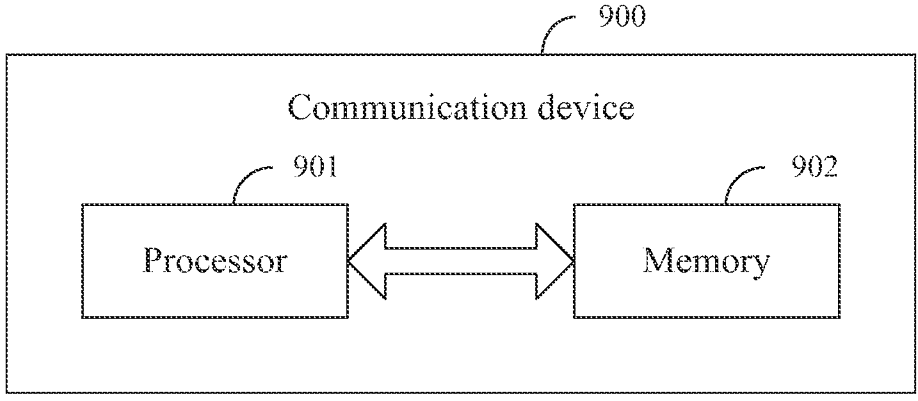
FIG. 9 is a structural diagram of a communication device according to an embodiment of this application.

In some implementations, as shown in FIG. 9, an embodiment of this application further provides a communication device 900, including a processor 901, a memory 902, a program or an instruction that is stored in the memory 902 and can be run on the processor 901. For example, when the communication device 900 is a terminal, the program or the instruction is executed by the processor 901 to implement the processes of the foregoing HARQ-ACK codebook construction method embodiment, and a same technical effect can be achieved. When the communication device 900 is a network side device, the program or the instruction is executed by the processor 901 to implement the processes of the foregoing HARQ-ACK codebook transmission method embodiment, and a same technical effect can be achieved. To avoid repetition, details are not described herein again.

Figure 10:
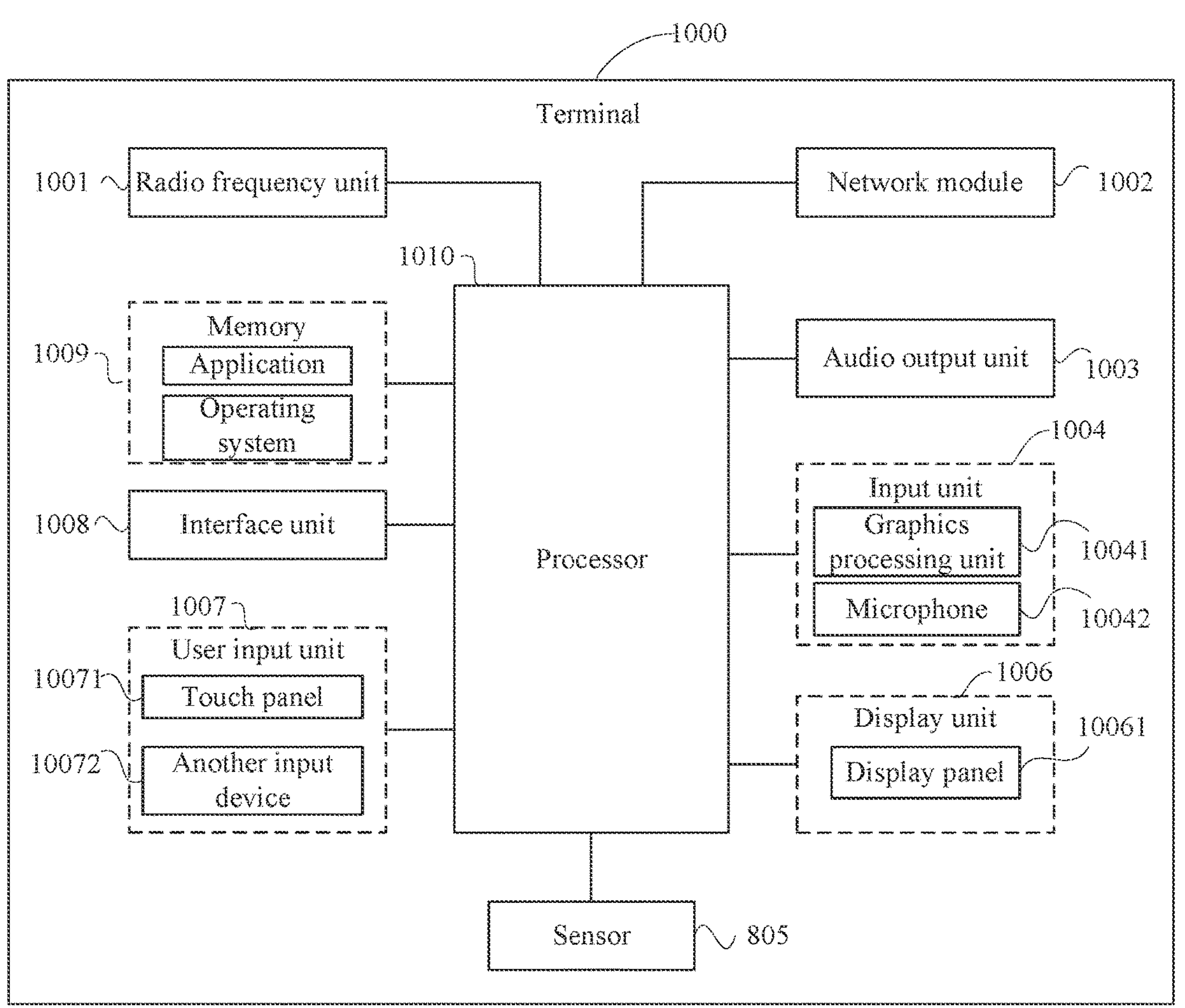
FIG. 10 is a structural diagram of a terminal according to an embodiment of this application.

An embodiment of this application further provides a terminal, including a processor and a communication interface. The processor is configured to: obtain a time domain feedback record set, where each time domain feedback record in the time domain feedback record set includes a time domain resource assignment record and an equivalent feedback time offset corresponding to the time domain resource assignment record, and the equivalent feedback time offset is a feedback time offset value actually applied when a HARQ-ACK for the time domain resource assignment record corresponding to the equivalent feedback time offset is fed back in an uplink slot; divide the time domain feedback record set into a plurality of subsets based on equivalent feedback time offset(s), where each equivalent feedback time offset corresponds to one subset; and construct a HARQ-ACK codebook based on the plurality of subsets obtained through division, to perform feedback in the uplink slot. This terminal embodiment corresponds to the foregoing method embodiment on the terminal side. Each implementation process and implementation of the foregoing method embodiment may be applicable to this terminal embodiment, and a same technical effect can be achieved. In some implementations, FIG. 10 is a schematic structural diagram of hardware of a terminal according to an embodiment of this application.

The terminal 1000 includes but is not limited to at least a part of components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the terminal 1000 may further include a power supply (such as a battery) that supplies power to each component. The power supply may be logically connected to the processor 1010 by using a power supply management system, to implement functions such as charging and discharging management, and power consumption management by using the power supply management system. The terminal structure shown in FIG. 10 constitutes no limitation on the terminal, and the terminal may include more or fewer components than those shown in the figure, or combine some components, or have different component arrangements. Details are not described herein.

It should be understood that, in this embodiment of this application, the input unit 1004 may include a Graphics Processing Unit (GPU) 10041 and a microphone 10042, and the graphics processing unit 10041 processes image data of a still picture or a video obtained by an image capture apparatus (such as a camera) in a video capture mode or an image capture mode. The display unit 1006 may include a display panel 10061. In some implementations, the display panel 10061 may be configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein.

In this embodiment of this application, the radio frequency unit 1001 receives downlink data from a network side device and then sends the downlink data to the processor 1010 for processing; and sends uplink data to the network side device. Usually, the radio frequency unit 1001 includes but is not limited to an antenna, at least one amplifier, a transceiver, a coupler, a low noise amplifier, a duplexer, and the like.

The memory 1009 may be configured to store a software program or an instruction and various data. The memory 1009 may mainly include a program or instruction storage area and a data storage area. The program or instruction storage area may store an operating system, and an application or an instruction required by at least one function (for example, a sound playing function or an image playing function). In addition, the memory 1009 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 1010 may include one or more processing units. In some implementations, an application processor and a modem processor may be integrated into the processor 1010. The application processor mainly processes an operating system, a user interface, an application, an instruction, or the like. The modem processor mainly processes wireless communication, for example, a baseband processor. It can be understood that, in some implementations, the modem processor may not be integrated into the processor 1010.

The processor 1010 is configured to:

obtain a time domain feedback record set, where each time domain feedback record in the time domain feedback record set includes a time domain resource assignment record and an equivalent feedback time offset corresponding to the time domain resource assignment record, and the equivalent feedback time offset is a feedback time offset value actually applied when a HARQ-ACK for the time domain resource assignment record corresponding to the equivalent feedback time offset is fed back in an uplink slot;

divide the time domain feedback record set into a plurality of subsets based on equivalent feedback time offset(s), where each equivalent feedback time offset corresponds to one subset; and construct a HARQ-ACK codebook based on the plurality of subsets obtained through division, to perform feedback in the uplink slot.

In some implementations, the processor 1010 is further configured to:

collect time domain feedback records corresponding to all initial candidate transmission occasions that are possibly scheduled, to obtain the time domain feedback record set.

In some implementations, the processor 1010 is further configured to:

traverse all feedback time offsets in a feedback time offset set, traverse all rows or all schedulable rows in a time domain resource assignment table, and traverse all time domain resource assignment records in any row or any schedulable row in the time domain resource assignment table, to obtain the time domain feedback records corresponding to all the initial candidate transmission occasions.

In some implementations, the processor 1010 is further configured to:

for a target feedback time offset and a first target row, assume that HARQ-ACK information corresponding to one piece of DCI is fed back in the HARQ-ACK codebook based on the target feedback time offset and one or more PDSCHs scheduled by the first target row, and traverse all time domain resource assignment records of the first target row, to determine one or more time domain feedback records corresponding to the pair of the target feedback time offset and the first target row; and take a union set of the obtained time domain feedback records, to obtain the time domain feedback record set corresponding to all the initial candidate transmission occasions, where the target feedback time offset is any feedback time offset obtained by traversing the feedback time offset set, the first target row is any row or any schedulable row obtained by traversing the time domain resource assignment table based on the target feedback time offset, and one PDSCH in the one or more scheduled PDSCHs corresponds to one initial candidate transmission occasion and one time domain feedback record.

In some implementations, the equivalent feedback time offset is determined based on the target feedback time offset and a target time domain offset, and the target time domain offset is a time domain offset between a slot in which an end moment of a time domain resource assignment record corresponding to the equivalent feedback time offset is located and a slot in which an end moment of a last time domain resource assignment record in the first target row is located.

In some implementations, in a case that the terminal has determined a feedback time offset, the processor 1010 is further configured to:

in a case that the uplink slot in which transmission of the HARQ-ACK codebook is located is determined, assume that a second target row employs the determined feedback time offset, and if a PDSCH corresponding to each time domain resource assignment record configured in the second target row does not conflict with any semi-static uplink symbol, determine the second target row as a schedulable row, where the second target row is any row in the time domain resource assignment table.

In some implementations, the processor 1010 is further configured to:

determine, based on a determined feedback time offset in the feedback time offset set, each row in the time domain resource assignment table is a schedulable row; and delete a row that is in the time domain resource assignment table and is not a schedulable row, and traverse the determined schedulable row.

In some implementations, the processor 1010 is further configured to:

traverse all rows in the time domain resource assignment table based on a determined feedback time offset in the feedback time offset set.

In some implementations, in a case that each PDSCH scheduled by a single piece of DCI feeds back a corresponding HARQ-ACK on a plurality of different PUCCHs, the processor 1010 is further configured to:

perform PDSCH subset division on a third target row in the time domain resource assignment table to obtain a new row, where all PDSCHs in the PDSCH subset feed back a corresponding HARQ-ACK on a same PUCCH, and one new row corresponds to time domain resource assignment of each PDSCH in one PDSCH subset; and add the new row to the time domain resource assignment table, to update the time domain resource assignment table; or add the new row to the time domain resource assignment table, and delete the third target row, to update the time domain resource assignment table, where the third target row is scheduled through division of the PDSCH subset; and traverse all rows or all schedulable rows in the updated time domain resource assignment table.

In some implementations, in a case that each PDSCH scheduled by a single piece of DCI feeds back a corresponding HARQ-ACK on a plurality of different PUCCHs, the processor 1010 is further configured to:

perform PDSCH subset division on a third target row in the time domain resource assignment table to obtain a new row, where the third target row is scheduled through division of the PDSCH subset, all PDSCHs in the PDSCH subset feed back a corresponding HARQ-ACK on a same PUCCH, and one new row corresponds to time domain resource assignment of each PDSCH in one PDSCH subset;

combine any row in the new rows with a corresponding first feedback time offset, determine a corresponding time domain feedback record, take a union set of the corresponding time domain feedback records to obtain a new time domain feedback record set, and update the time domain feedback record set based on the new time domain feedback record set, where the first feedback time offset is a feedback time offset value actually applied when a HARQ-ACK corresponding to the PDSCH subset corresponding to the new row is fed back in the uplink slot; and divide the updated time domain feedback record set into subsets based on the equivalent feedback time offset.

In some implementations, the processor 1010 is further configured to:

determine an equivalent feedback time offset set, and traverse, based on a target equivalent feedback time offset, a time domain feedback record that is in the time domain feedback record set and that matches the target equivalent feedback time offset, to divide the time domain feedback record set into subsets, where the target equivalent feedback time offset is any equivalent feedback time offset in the equivalent feedback time offset set; or traverse the time domain feedback record set, and in a case that there is a target subset corresponding to an equivalent feedback time offset corresponding to a target time domain feedback record in the time domain feedback record set, classify the target time domain feedback record into the target subset, and in a case that there is no target subset corresponding to the equivalent feedback time offset corresponding to the target time domain feedback record, establish a target subset corresponding to the target time domain feedback record, and classify the target time domain feedback record into the target subset.

In some implementations, the processor 1010 is further configured to:

determine a candidate transmission occasion set corresponding to a target serving cell based on the plurality of subsets obtained through division; and reserve and set a HARQ-ACK bit for each candidate transmission occasion in the candidate transmission occasion set, to obtain the HARQ-ACK codebook.

In some implementations, the processor 1010 is further configured to:

traverse all equivalent feedback time offsets, and divide a subset corresponding to each equivalent feedback time offset into one or more time domain resource assignment record subsets based on time domain overlapping, where each time domain resource assignment record subset corresponds to one candidate transmission occasion; and arrange a candidate transmission occasion corresponding to each equivalent feedback time offset in a preset order, to obtain the candidate transmission occasion set corresponding to the target serving cell.

In some implementations, the processor 1010 is further configured to:

before the subset corresponding to each equivalent feedback time offset is divided into the one or more time domain resource assignment record subsets based on time domain overlapping, delete a time domain feedback record that conflicts with a semi-static uplink symbol in the subset; or when the subset corresponding to each equivalent feedback time offset is divided into the one or more time domain resource assignment record subsets based on time domain overlapping, delete a time domain feedback record that conflicts with a semi-static uplink symbol in the subset.

In some implementations, the processor 1010 is further configured to:

determine a first quantity of candidate transmission occasions in the candidate transmission occasion set, and determine a second quantity of HARQ-ACK bits corresponding to each candidate transmission occasion in a HARQ-ACK bit sequence corresponding to the HARQ-ACK codebook; and determine a length of the HARQ-ACK bit sequence based on the first quantity and the second quantity, to obtain the HARQ-ACK codebook.

In some implementations, the second quantity is associated with at least one of a maximum quantity of code words configured for the target serving cell, a spatial bundling configuration, and a code block group CBG transmission configuration.

In some implementations, in a case that each PDSCH scheduled by a single piece of DCI feeds back a corresponding HARQ-ACK on a same PUCCH, an uplink SubCarrier Spacing (SCS) is different from a downlink SCS, and an uplink U value is less than a preset value, each time domain feedback record in the time domain feedback record set further includes a downlink slot index; and the processor 1010 is further configured to:

divide the time domain feedback record set into first subsets based on equivalent feedback time offsets, and divide a target first subset into second subsets based on the downlink slot indexes in time domain feedback records, where the target first subset is any first subset;

traverse all equivalent feedback time offsets;

traverse all downlink slot indexes of a first subset corresponding to a target equivalent feedback time offset, and divide a second subset corresponding to each downlink slot index of the target equivalent feedback time offset into one or more time domain resource assignment record subsets based on time domain overlapping, where each time domain resource assignment record subset corresponds to one candidate transmission occasion, and the target equivalent feedback time offset is any equivalent feedback time offset;

arrange a candidate transmission occasion corresponding to each downlink slot index in all downlink slot indexes corresponding to the target equivalent feedback time offset in a preset order, to obtain a target candidate transmission occasion subset corresponding to the target equivalent feedback time offset;

arrange a candidate transmission occasion subset corresponding to each equivalent feedback time offset in the preset order, to obtain a candidate transmission occasion set corresponding to a target serving cell; and reserve and set a HARQ-ACK bit for each candidate transmission occasion in the candidate transmission occasion set, to obtain the HARQ-ACK codebook.

In this embodiment of this application, the terminal 1000 defines an equivalent feedback time offset based on a feedback time offset value actually applied when a HARQ-ACK corresponding to a time domain resource assignment record is fed back in an uplink slot. Therefore, a time domain feedback record set obtained by the terminal 1000 is a time domain feedback record set that can be actually scheduled, and a HARQ-ACK codebook is constructed based on the time domain feedback record set that can be actually scheduled. In this way, it can be ensured that only a HARQ-ACK bit corresponding to a candidate transmission occasion that can be actually scheduled exists in the constructed codebook, thereby avoiding a redundant HARQ-ACK bit in the codebook and effectively reducing overheads of the terminal 1000.

An embodiment of this application further provides a network side device, including a processor and a communication interface, where the communication interface is configured to receive a HARQ-ACK codebook sent by a terminal, and the processor is configured to parse the HARQ-ACK codebook. This network side device embodiment corresponds to the foregoing method embodiment on the network side device. Each implementation process and implementation of the foregoing method embodiment may be applicable to this network side device embodiment, and a same technical effect can be achieved.

Figure 11:
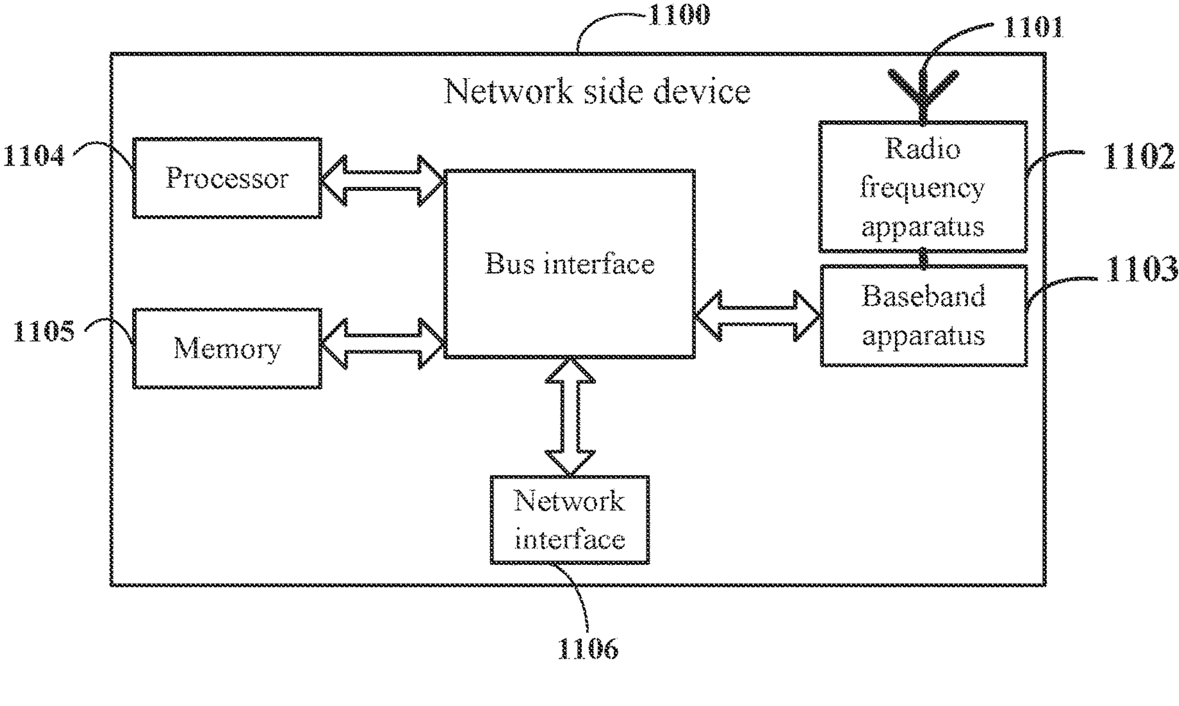
FIG. 11 is a structural diagram of a network side device according to an embodiment of this application.

In some implementations, an embodiment of this application further provides a network side device. As shown in FIG. 11, a network device 1100 includes an antenna 1101, a radio frequency apparatus 1102, and a baseband apparatus 1103. The antenna 1101 is connected to the radio frequency apparatus 1102. In an uplink direction, the radio frequency apparatus 1102 receives information by using the antenna 1101, and sends the received information to the baseband apparatus 1103 for processing. In a downlink direction, the baseband apparatus 1103 processes information that needs to be sent, and sends processed information to the radio frequency apparatus 1102. The radio frequency apparatus 1102 processes the received information, and sends processed information by using the antenna 1101.

The frequency band processing apparatus may be located in the baseband apparatus 1103. The method performed by the network side device in the foregoing embodiment may be implemented in the baseband apparatus 1103. The baseband apparatus 1103 includes a processor 1104 and a memory 1105.

The baseband apparatus 1103 may include, for example, at least one baseband board, where a plurality of chips are disposed on the baseband board. As shown in FIG. 11, one chip is, for example, the processor 1104, which is connected to the memory 1105, so as to invoke a program in the memory 1105 to perform operations of the network device shown in the foregoing method embodiment.

The baseband apparatus 1103 may further include a network interface 1106, configured to exchange information with the radio frequency apparatus 1102. For example, the interface is a Common Public Radio Interface (CPRI for short).

In some implementations, the network side device in this embodiment of the present disclosure further includes an instruction or a program that is stored in the memory 1105 and that can be run on the processor 1104. The processor 1104 invokes the instruction or the program in the memory 1105 to perform the method performed by the modules shown in FIG. 8, and a same technical effect is achieved. To avoid repetition, details are not described herein again.

An embodiment of this application further provides a readable storage medium. The readable storage medium stores a program or an instruction, and the program or the instruction is executed by a processor to implement the processes of the foregoing HARQ-ACK codebook construction method embodiment, or the processes of the foregoing HARQ-ACK codebook transmission method embodiment, and a same technical effect can be achieved. To avoid repetition, details are not described herein again.

The processor is a processor in the terminal in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing HARQ-ACK codebook construction method embodiment, or the processes of the foregoing HARQ-ACK codebook transmission method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application provides a communication device, configured to perform the processes of the foregoing method embodiments, and a same technical effect can be achieved. To avoid repetition, details are not described herein again.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the related art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A Hybrid Automatic Repeat reQuest ACKnowledgement (HARQ-ACK) codebook construction method, comprising:

obtaining, by a terminal, a time domain feedback record set comprising time domain feedback records, wherein each time domain feedback record in the time domain feedback record set comprises a time domain resource assignment record and an equivalent feedback time offset corresponding to the time domain resource assignment record, the time domain resource assignment record comprises a start and length indicator value (SLIV), and the equivalent feedback time offset is a feedback time offset value actually applied when a HARQ-ACK for the time domain resource assignment record corresponding to the equivalent feedback time offset is fed back in an uplink slot;

dividing, by the terminal, the time domain feedback record set into a plurality of time domain feedback record subsets based on equivalent feedback time offsets, wherein each equivalent feedback time offset corresponds to one of the time domain feedback record subsets; and constructing, by the terminal, a HARQ-ACK codebook based on the plurality of time domain feedback record subsets obtained through division, to perform feedback in the uplink slot, wherein obtaining, by the terminal, the time domain feedback record set comprises:

traversing, by the terminal, all feedback time offsets in a feedback time offset set, traversing all rows or all schedulable rows in a time domain resource assignment table, and traversing all time domain resource assignment records in any row or any schedulable row in the time domain resource assignment table, to obtain the time domain feedback records corresponding to all initial candidate transmission occasions in which physical downlink shared channels (PDSCHs) are possibly scheduled, wherein one PDSCH in the PDSCHs that are possibly scheduled corresponds to one initial candidate transmission occasion and one time domain feedback record, and wherein each row in the time domain resource assignment table includes one or more SLIVs.

2. The HARQ-ACK codebook construction method according to claim 1, wherein the traversing, by the terminal, all feedback time offsets in a feedback time offset set, traversing all rows or all schedulable rows in a time domain resource assignment table, and traversing all time domain resource assignment records in any row or any schedulable row in the time domain resource assignment table, to obtain the time domain feedback records corresponding to all the initial candidate transmission occasions comprises:

for a target feedback time offset and a first target row, assuming, by the terminal, that HARQ-ACK information corresponding to one piece of Downlink Control Information (DCI) is fed back in the HARQ-ACK codebook based on the target feedback time offset and one or more PDSCHs scheduled by the first target row, and traversing time domain resource assignment records of the first target row, to determine one or more time domain feedback records corresponding to the pair of the target feedback time offset and the first target row; and taking, by the terminal, a union set of the obtained time domain feedback records, to obtain the time domain feedback record set corresponding to all the initial candidate transmission occasions, wherein the target feedback time offset is any feedback time offset obtained by traversing the feedback time offset set, and the first target row is any row or any schedulable row obtained by traversing the time domain resource assignment table based on the target feedback time offset.

3. The HARQ-ACK codebook construction method according to claim 2, wherein the equivalent feedback time offset is determined based on the target feedback time offset and a target time domain offset, and the target time domain offset is a time domain offset between a slot in which an end moment of a time domain resource assignment record corresponding to the equivalent feedback time offset is located and a slot in which an end moment of a last time domain resource assignment record is located.

4. The HARQ-ACK codebook construction method according to claim 1, wherein when the terminal has determined a feedback time offset, the schedulable row is determined in the following manner:

when the uplink slot in which transmission of the HARQ-ACK codebook is located is determined, assuming, by the terminal, that a second target row employs the determined feedback time offset, and when a PDSCH corresponding to each time domain resource assignment record configured in the second target row does not conflict with any semi-static uplink symbol, determining the second target row as a schedulable row, wherein the second target row is any row in the time domain resource assignment table.

5. The HARQ-ACK codebook construction method according to claim 4, wherein the traversing, by the terminal, all schedulable rows in a time domain resource assignment table comprises:

determining, by the terminal based on a determined feedback time offset in the feedback time offset set, wherein each row in the time domain resource assignment table is a schedulable row; and deleting, by the terminal, a row that is in the time domain resource assignment table and is not a schedulable row, and traversing the determined schedulable row.

6. The HARQ-ACK codebook construction method according to claim 1, wherein the traversing, by the terminal, all rows in a time domain resource assignment table comprises:

traversing, by the terminal, all rows in the time domain resource assignment table based on a determined feedback time offset in the feedback time offset set.

7. The HARQ-ACK codebook construction method according to claim 1, wherein when each PDSCH scheduled by a single piece of Downlink Control Information (DCI)

feeds back a corresponding HARQ-ACK on a plurality of different Physical Uplink Control CHannels (PUCCHs), the HARQ-ACK codebook construction method further comprises:

performing, by the terminal, PDSCH subset division on a third target row in the time domain resource assignment table to obtain a new row, wherein all PDSCHs in the PDSCH subset feed back a corresponding HARQ-ACK on a same PUCCH, and one new row corresponds to time domain resource assignment of each PDSCH in one PDSCH subset; and adding, by the terminal, the new row to the time domain resource assignment table, to update the time domain resource assignment table, or adding, by the terminal, the new row to the time domain resource assignment table, and deleting the third target row, to update the time domain resource assignment table, wherein the third target row is scheduled through division of the PDSCH subset, and wherein the traversing, by the terminal, all rows or all schedulable rows in a time domain resource assignment table comprises:

traversing, by the terminal, all rows or all schedulable rows in the updated time domain resource assignment table.

8. The HARQ-ACK codebook construction method according to claim 1, wherein when each PDSCH scheduled by a single piece of Downlink Control Information (DCI) feeds back a corresponding HARQ-ACK on a plurality of different Physical Uplink Control CHannels (PUCCHs), the HARQ-ACK codebook construction method further comprises:

performing, by the terminal, PDSCH subset division on a third target row in the time domain resource assignment table to obtain a new row, wherein the third target row is scheduled through division of the PDSCH subset, all PDSCHs in the PDSCH subset feed back a corresponding HARQ-ACK on a same PUCCH, and one new row corresponds to time domain resource assignment of each PDSCH in one PDSCH subset; and combining any row in the new rows with a corresponding first feedback time offset, determining a corresponding time domain feedback record, taking a union set of the corresponding time domain feedback records to obtain a new time domain feedback record set, and updating the time domain feedback record set based on the new time domain feedback record set, wherein the first feedback time offset is a feedback time offset value actually applied when a HARQ-ACK corresponding to the PDSCH subset corresponding to the new row is fed back in the uplink slot, wherein the dividing, by the terminal, the time domain feedback record set into a plurality of time domain feedback record subsets based on the equivalent feedback time offsets comprises:

dividing, by the terminal, the updated time domain feedback record set into the plurality of time domain feedback record subsets based on the equivalent feedback time offsets.

9. The HARQ-ACK codebook construction method according to claim 1, wherein the dividing, by the terminal, the time domain feedback record set into a plurality of time domain feedback record subsets based on equivalent feedback time offsets comprises any one of the following:

determining, by the terminal, an equivalent K1 set, and traversing, based on target equivalent K1, a time domain feedback record that is in the time domain feedback record set and that matches the target equivalent feedback time offset, to divide the time domain feedback record set into the plurality of time domain feedback record subsets, wherein the target equivalent feedback time offset is any equivalent feedback time offset in the equivalent feedback time offset set; or traversing, by the terminal, the time domain feedback record set, and when there is a target time domain feedback record subset corresponding to an equivalent feedback time offset corresponding to a target time domain feedback record in the time domain feedback record set, classifying the target time domain feedback record into the target time domain feedback record subset, and when there is no target time domain feedback record subset corresponding to the equivalent feedback time offset corresponding to the target time domain feedback record, establishing a target time domain feedback record subset corresponding to the target time domain feedback record, and classifying the target time domain feedback record into the target time domain feedback record subset.

10. The HARQ-ACK codebook construction method according to claim 1, wherein the constructing, by the terminal, a HARQ-ACK codebook based on the plurality of time domain feedback record subsets obtained through division comprises:

determining, by the terminal, a candidate transmission occasion set corresponding to a target serving cell based on the plurality of time domain feedback record subsets obtained through division; and reserving and setting, by the terminal, a HARQ-ACK bit for each candidate transmission occasion in the candidate transmission occasion set, to obtain the HARQ-ACK codebook.

11. The HARQ-ACK codebook construction method according to claim 10, wherein the determining, by the terminal, a candidate transmission occasion set corresponding to a target serving cell based on the plurality of time domain feedback record subsets obtained through division comprises:

traversing, by the terminal, all equivalent feedback time offsets, and dividing a time domain feedback record subset corresponding to each equivalent feedback time offset into one or more time domain resource assignment record subsets based on time domain overlapping, wherein each time domain resource assignment record subset corresponds to one candidate transmission occasion; and arranging a candidate transmission occasion corresponding to each equivalent feedback time offset in a preset order, to obtain the candidate transmission occasion set corresponding to the target serving cell.

12. The HARQ-ACK codebook construction method according to claim 11, wherein the HARQ-ACK codebook construction method further comprises:

before dividing the time domain feedback record subset corresponding to each equivalent feedback time offset into the one or more time domain resource assignment record subsets based on time domain overlapping, deleting, by the terminal, a time domain feedback record that conflicts with a semi-static uplink symbol in the time domain feedback record subset; or when dividing the time domain feedback record subset corresponding to each equivalent feedback time offset into the one or more time domain resource assignment record subsets based on time domain overlapping, deleting, by the terminal, a time domain feedback record that conflicts with a semi-static uplink symbol in the time domain feedback record subset.

13. The HARQ-ACK codebook construction method according to claim 10, wherein the reserving and setting, by the terminal, a HARQ-ACK bit for each candidate transmission occasion in the candidate transmission occasion set, to obtain the HARQ-ACK codebook comprises:

determining, by the terminal, a first quantity of candidate transmission occasions in the candidate transmission occasion set, and determining a second quantity of HARQ-ACK bits corresponding to each candidate transmission occasion in a HARQ-ACK bit sequence corresponding to the HARQ-ACK codebook; and determining a length of the HARQ-ACK bit sequence based on the first quantity and the second quantity, to obtain the HARQ-ACK codebook.

14. The HARQ-ACK codebook construction method according to claim 13, wherein the second quantity is associated with at least one of a maximum quantity of code words configured for the target serving cell, a spatial bundling configuration, and a Code Block Group (CBG) transmission configuration.

15. The HARQ-ACK codebook construction method according to claim 1, wherein when each PDSCH scheduled by a single piece of Downlink Control Information (DCI) feeds back a corresponding HARQ-ACK on a same Physical Uplink Control CHannel (PUCCH), an uplink SubCarrier Spacing (SCS) is different from a downlink SCS, and an uplink U value is less than a preset value, each time domain feedback record in the time domain feedback record set further comprises a downlink slot index;

the dividing, by the terminal, the time domain feedback record set into a plurality of time domain feedback record subsets based on the equivalent feedback time offsets comprises:

dividing, by the terminal, the time domain feedback record set into first time domain feedback record subsets based on the equivalent feedback time offsets, and dividing a target first subset into second time domain feedback record subsets based on the downlink slot indexes in time domain feedback records, wherein the target first subset is any first time domain feedback record subset; and the constructing, by the terminal, a HARQ-ACK codebook based on the plurality of time domain feedback record subsets obtained through division comprises:

traversing, by the terminal, all equivalent feedback time offsets;

traversing, by the terminal, all downlink slot indexes of a first time domain feedback record subset corresponding to a target equivalent feedback time offset, and dividing a second time domain feedback record subset corresponding to each downlink slot index of the target equivalent feedback time offset into one or more time domain resource assignment record subsets based on time domain overlapping, wherein each time domain resource assignment record subset corresponds to one candidate transmission occasion, and the target equivalent feedback time offset is any equivalent feedback time offset;

arranging, by the terminal, a candidate transmission occasion corresponding to each downlink slot index in all downlink slot indexes corresponding to the target equivalent feedback time offset in a preset order, to obtain a target candidate transmission occasion subset corresponding to the target equivalent feedback time offset;

arranging, by the terminal, a candidate transmission occasion subset corresponding to each equivalent feedback time offset in the preset order, to obtain a candidate transmission occasion set corresponding to a target serving cell; and reserving and setting, by the terminal, a HARQ-ACK bit for each candidate transmission occasion in the candidate transmission occasion set, to obtain the HARQ-ACK codebook.

16. The HARQ-ACK codebook construction method according to claim 1, further comprising:

sending, by the terminal, the HARQ-ACK codebook in the uplink slot.

17. A terminal, comprising:

a memory storing computer-readable instructions; and a processor coupled to the memory and configured to execute the computer-readable instructions, wherein the computer-readable instructions, when executed by the processor, cause the processor to perform operations comprising:

obtaining a time domain feedback record set comprising time domain feedback records, wherein each time domain feedback record in the time domain feedback record set comprises a time domain resource assignment record, the time domain resource assignment record comprises a start and length indicator value (SLIV), and an equivalent feedback time offset corresponding to the time domain resource assignment record, and the equivalent feedback time offset is a feedback time offset value actually applied when a Hybrid Automatic Repeat reQuest ACKnowledgement (HARQ-ACK) for the time domain resource assignment record corresponding to the equivalent feedback time offset is fed back in an uplink slot;

dividing the time domain feedback record set into a plurality of time domain feedback record subsets based on equivalent feedback time offsets, wherein each equivalent feedback time offset corresponds to one of the time domain feedback record subsets; and constructing a HARQ-ACK codebook based on the plurality of time domain feedback record subsets obtained through division, to perform feedback in the uplink slot, wherein obtaining, by the terminal, the time domain feedback record set comprises:

traversing, by the terminal, all feedback time offsets in a feedback time offset set, traversing all rows or all schedulable rows in a time domain resource assignment table, and traversing all time domain resource assignment records in any row or any schedulable row in the time domain resource assignment table, to obtain the time domain feedback records corresponding to all initial candidate transmission occasions in which physical downlink shared channels (PDSCHs) are possibly scheduled, wherein one PDSCH in the PDSCHs that are possibly scheduled corresponds to one initial candidate transmission occasion and one time domain feedback record, and wherein each row in the time domain resource assignment table includes one or more SLIVs.

18. A non-transitory computer-readable medium storing instructions that, when executed by a processor, cause the processor to perform operations comprising:

obtaining a time domain feedback record set comprising time domain feedback records, wherein each time domain feedback record in the time domain feedback record set comprises a time domain resource assignment record, the time domain resource assignment record comprises a start and length indicator value (SLIV), and an equivalent feedback time offset corresponding to the time domain resource assignment record, and the equivalent feedback time offset is a feedback time offset value actually applied when a Hybrid Automatic Repeat reQuest ACKnowledgement (HARQ-ACK) for the time domain resource assignment record corresponding to the equivalent feedback time offset is fed back in an uplink slot;

dividing the time domain feedback record set into a plurality of time domain feedback record subsets based on equivalent feedback time offsets, wherein each equivalent feedback time offset corresponds to one of the time domain feedback record subsets; and constructing a HARQ-ACK codebook based on the plurality of time domain feedback record subsets obtained through division, to perform feedback in the uplink slot, wherein obtaining, by the terminal, the time domain feedback record set comprises:

traversing, by the terminal, all feedback time offsets in a feedback time offset set, traversing all rows or all schedulable rows in a time domain resource assignment table, and traversing all time domain resource assignment records in any row or any schedulable row in the time domain resource assignment table, to obtain the time domain feedback records corresponding to all initial candidate transmission occasions in which physical downlink shared channels (PDSCHs) are possibly scheduled, wherein one PDSCH in the PDSCHs that are possibly scheduled corresponds to one initial candidate transmission occasion and one time domain feedback record, and wherein each row in the time domain resource assignment table includes one or more SLIVs.

19. The HARQ-ACK codebook construction method according to claim 3, wherein the last time domain resource assignment record is located in a row or a schedulable row in which the time domain resource assignment record is located in the time domain resource assignment table.

20. The terminal according to claim 17, wherein the traversing, by the terminal, all feedback time offsets in a feedback time offset set, traversing all rows or all schedulable rows in a time domain resource assignment table, and traversing all time domain resource assignment records in any row or any schedulable row in the time domain resource assignment table, to obtain the time domain feedback records corresponding to all the initial candidate transmission occasions comprises:

for a target feedback time offset and a first target row, assuming, by the terminal, that HARQ-ACK information corresponding to one piece of Downlink Control Information (DCI) is fed back in the HARQ-ACK codebook based on the target feedback time offset and one or more PDSCHs scheduled by the first target row, and traversing time domain resource assignment records of the first target row, to determine one or more time domain feedback records corresponding to the pair of the target feedback time offset and the first target row; and taking, by the terminal, a union set of the obtained time domain feedback records, to obtain the time domain feedback record set corresponding to all the initial candidate transmission occasions, wherein the target feedback time offset is any feedback time offset obtained by traversing the feedback time offset set, and the first target row is any row or any schedulable row obtained by traversing the time domain resource assignment table based on the target feedback time offset.

* * * * *